(12) United States Patent
Araki

(10) Patent No.: US 8,300,826 B2
(45) Date of Patent: Oct. 30, 2012

(54) DISTRIBUTED INFORMATION GENERATION APPARATUS, RECONSTRUCTION APPARATUS, RECONSTRUCTION RESULT VERIFICATION APPARATUS, AND SECRET INFORMATION DISTRIBUTION SYSTEM, METHOD, AND PROGRAM

(75) Inventor: Toshinori Araki, Tokyo (JP)

(73) Assignee: NEC Corporation, Tokyo (JP)

( * ) Notice: Subject to any disclaimer, the term of this patent is extended or adjusted under 35 U.S.C. 154(b) by 493 days.

(21) Appl. No.: 12/525,596

(22) PCT Filed: Jan. 30, 2008

(86) PCT No.: PCT/JP2008/051336
§ 371 (c)(1),
(2), (4) Date: Aug. 3, 2009

(87) PCT Pub. No.: WO2008/093690
PCT Pub. Date: Aug. 7, 2008

(65) Prior Publication Data
US 2010/0287366 A1    Nov. 11, 2010

(30) Foreign Application Priority Data
Feb. 2, 2007 (JP) ................. 2007-023907

(51) Int. Cl.
H04L 29/06 (2006.01)
(52) U.S. Cl. ............ 380/277; 380/28; 380/47; 380/278; 713/150
(58) Field of Classification Search .............. 380/28, 380/30, 47, 277, 278; 713/150
See application file for complete search history.

(56) References Cited

U.S. PATENT DOCUMENTS

| | | | |
|---|---|---|---|
| 5,345,507 A * | 9/1994 | Herzberg et al. | 380/28 |
| 5,519,778 A * | 5/1996 | Leighton et al. | 380/30 |
| 6,665,405 B1 * | 12/2003 | Lenstra | 380/28 |
| 6,754,824 B1 * | 6/2004 | Persson et al. | 713/181 |
| 7,313,701 B2 * | 12/2007 | Frankel et al. | 713/180 |
| 2004/0151309 A1 * | 8/2004 | Gentry et al. | 380/30 |
| 2004/0174997 A1 * | 9/2004 | Yamamichi et al. | 380/44 |

OTHER PUBLICATIONS

International Search Report for PCT/JP2008/051336 mailed Mar. 11, 2008.
A. Shamir "How to Share a Secret", Communications of the ACM, vol. 22, No. 11, Nov. 1979, p. 612-613.
G. R. Blakley et al., "Security of Ramp Schemes", Proceedings of CRYPTO 84, LNCS, 1985, 196, p. 242-268.
M. Tompa et al., "How to Share a Secret with Cheaters", Advances in Cryptology—CRYPTO'86, 263 LNCS, 1987, p. 261-265.

(Continued)

Primary Examiner — Jung Kim
Assistant Examiner — Tri Tran

(57) ABSTRACT

Disclosed is a distributed information generation apparatus which generates a polynomial F in which secret information s is embedded to output distributed secret information, generates a polynomial G in which an output when a fixed value t is entered into the polynomial F is embedded as the secret information, and generates distributed distributed secret information. The reconstruction apparatus receives k sets of the distributed secret information to generate a polynomial F', and receives k sets of the distributed distributed secret information to generate a polynomial G'. When a value embedded in the polynomial G' as the secret information and an output obtained by entering the fixed value into the polynomial F' is equal, the distributed information generation apparatus outputs the embedded value. When the embedded value is not equal to the output, the distributed information generation apparatus outputs information indicating detection of cheating.

42 Claims, 8 Drawing Sheets

OTHER PUBLICATIONS

W. Ogata et al., "Optimum Secret Sharing Scheme Secure Against Cheating", SIAM J. Discrete Math, 2006, vol. 20. No. 1, p. 79-95.

T. Araki, "Efficient (k,n) Threshold Secret Sharing Schemes Secure against Cheating from n-1 Cheaters". The 2008 Symposium on Cryptography and Information Security, Jan. 22, 2008.

S. Yamashita et al., "A study of Secret Sharing Scheme using a Polynomial", The 2006 Symposium on Cryptography and Information Security, Jan. 17, 2006.

* cited by examiner

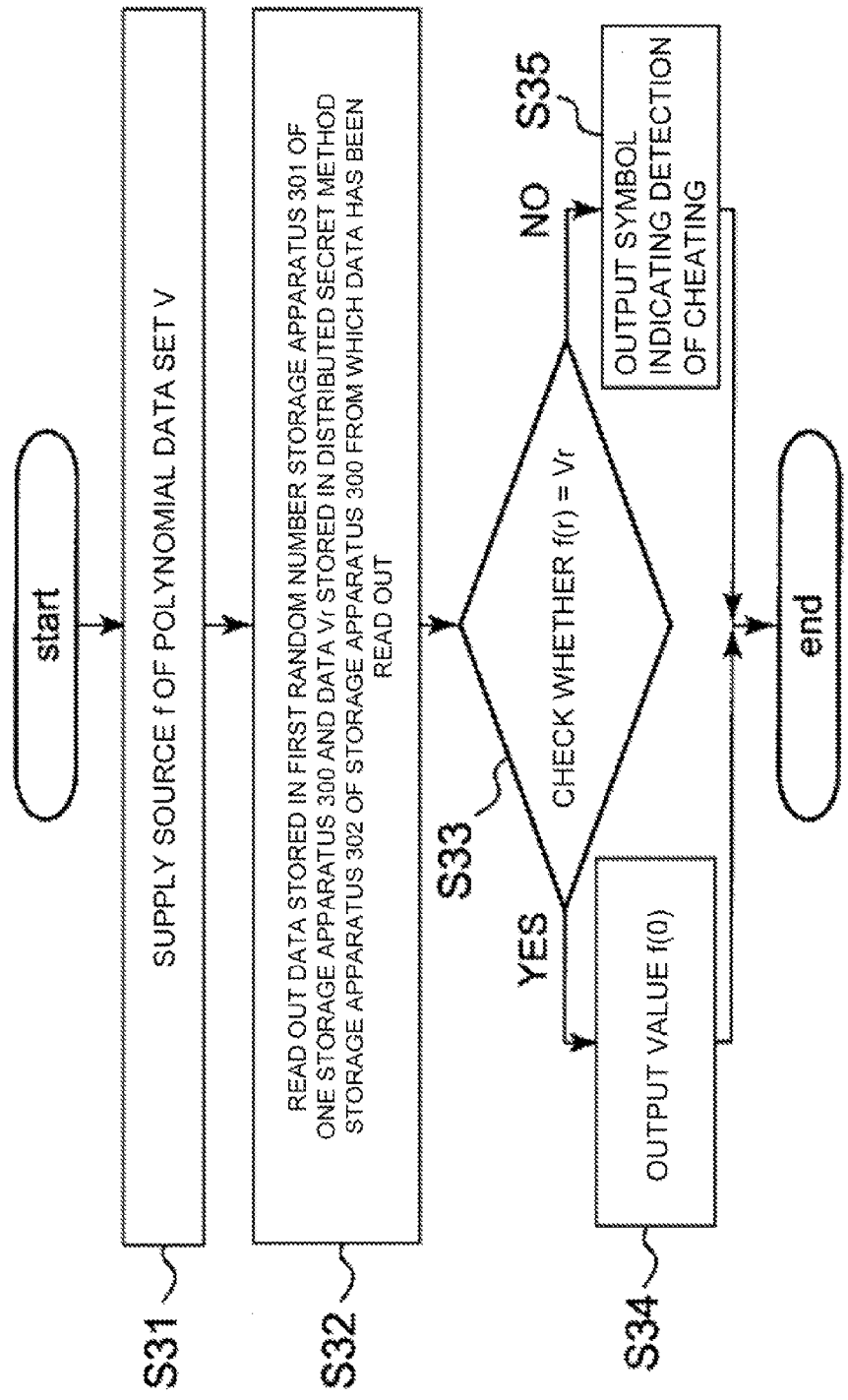

DISTRIBUTED INFORMATION GENERATION APPARATUS, RECONSTRUCTION APPARATUS, RECONSTRUCTION RESULT VERIFICATION APPARATUS, AND SECRET INFORMATION DISTRIBUTION SYSTEM, METHOD, AND PROGRAM

This application is the National Phase of PCT/JP2008/051336, filed Jan. 30, 2008, which is based upon and claims priority from Japanese Patent Application No. 2007-023907 (filed on Feb. 2, 2007), the entirety of which is regarded as being incorporated by reference herein.

TECHNICAL FIELD

The present invention relates to a distributed information generation apparatus, a reconstruction apparatus, a reconstruction result verification apparatus, a secret information distribution system, a distributed information generation method, a reconstruction method, a reconstruction result verification method, a secret information distribution method, a distributed information generation program, a reconstruction program, a reconstruction result verification program, and a secret information distribution program, for distributing and reconstructing secret information.

BACKGROUND ART

When storing information that is secret (hereinafter written as secret information), there is a threat of loss or destruction of the secret information and a threat of theft of the secret information. Generation of a copy of the secret information is effective against the threat of loss or destruction of the secret information. However, when the copy is generated, the threat of the theft would increase.

As one of means for solving such a problem, secret sharing schemes are provided. A(k,n) threshold scheme, which is one of the secret sharing schemes, has the following feature. In this method, secret information is encoded into n distributed information, and the secret information can be completely reconstructed by collection of arbitrary k or more pieces of the n distributed information. However, when (k−1) pieces of the distributed information are just collected, information on the secret information cannot entirely be obtained. Accordingly, even if the (k−1) pieces of the distributed information are stolen, the secret information will not leak. Further, even if (n−k) pieces of the distributed information are destroyed, the secret information can be reconstructed.

Non-patent Document 1 describes use of a (k−1)-degree polynomial, as the (k,n) threshold scheme. In the method described in Non-patent Document 1, a finite field GF(p) for a prime number p or a power of the prime number p is used as a data set of secret information. Then, points $(x_1, f(x_1)), \ldots, (x_n, f(x_n))$ on a random (k−1)-degree polynomial f(x) on the finite field GF(p) having the secret information in its constant term are set to distributed information. The (k−1)-degree polynomial can be uniquely reconstructed from k pieces of the distributed information, and the secret information s, which is a value f(0) can be reconstructed. The value f(0) cannot be determined from (k−1) or less pieces of the distributed information. Thus, information on the secret information s never leaks.

In a method described in Non-patent Document 2, points $(x_1, f(x_1)), \ldots (x_n, f(x_n))$ on a random (k−1)-degree polynomial f(x) on a finite field GF(p) are set to distributed information, as in the method described in Non-patent Document 1. By embedding secret information in first and higher-degree coefficients other than the constant term of the (k−1)-degree polynomial, for example, the size of the distributed information can be reduced. However, there is a disadvantage that information on the secret information leaks from (k−1) or less pieces of the distributed information. The size of the distributed information is the number of elements in the group of the distributed information.

As a common property between the methods described in Non-patent Documents 1 and 2, it can be pointed out that numbers assigned to apparatuses that store the distributed information can be used as $x_i$ (i=1, ..., n). In the following description, $f(x_i)$ for $x_i$ is referred to as the distributed information on $x_i$.

In a method described in Non-patent Document 3, cheating is detected in the (k,n) threshold scheme described in Non-patent Documents 1 and 2. Assume that a probability capable of detecting cheating is set to (1−ϵ) and secret information is selected from a group of elements in which the number of the elements is s. Then, distributed information are elements of a group in which the number of the elements is $((s-1)(k-1)/\epsilon + k)^2$. In this method, even if a maximum of (k−1) pieces of k distributed information used at a time of reconstruction is tampered, cheating can be detected.

Non-patent Document 4 describes a method in which the size of distributed information is smaller than that in the method described in Non-patent Document 3 and cheating can be detected even if a maximum of (k−1) pieces of distributed information is tampered.

Non-Patent Document 1:
Adi Shamir, "How to share a secret", Comm. ACM, 1979, 22(11), 612-613

Non-Patent Document 2:
G R Blakley, Catherine Meadows, Security of Ramp schemes, Proceedings of CRYPTO 84, LNCS, 1985, 196, Pages: 242-268

Non-Patent Document 3:
Martin Tompa, Heather Woll, How to Share a Secret with Cheaters, Advances in Cryptology—CRYPTO' 86, 263 LNCS, 1987, pp. 261-265

Non-Patent Document 4:
Wakaha Ogata, Kaoru Kurosawa, Douglas R Stinson, "Optimum Secret Sharing Scheme Secure Against Cheating", SIAM J. Discrete Math, 2006, vol. 20, no 1, p. 79-95

SUMMARY

The disclosures of the Patent Documents 1 to 4 described above are incorporated herein by reference. Analyses of the related arts by the present invention will be given below.

Let us consider a situation where distributed information is correctly generated and distributed in the normal (k,n) threshold scheme described in Non-patent Documents 1 and 2. A person who is to reconstruct secret information collects the distributed information from other people who hold the distributed information. However, a person who was requested for the distributed information does not always give a value of the distributed information without tampering. A value obtained by reconstruction using the tampered distributed information may be different from that of the secret information. When distributed will data is given to descendants, for example, it is troublesome that the distributed data be tampered and then rewritten to the content convenient for some of the descendants.

For that reason, a method is desired which can detect presence of a value that has been so tampered that distributed secret information and a reconstruction result of the distributed secret information have different values in distributed information used for reconstruction, with a high probability. In the following description, a participant in a secret sharing scheme who gives tampered distributed information will be referred to as a cheater.

The methods described in Non-patent Documents 3 and 4 are known as the methods whereby these problems are solved. In the method described in Non-patent Document 3, however, there is a problem that, the size of distributed information is significantly increased. Further, in the method described in Non-patent Document 4, a condition is needed which the cheater who generates (k−1) pieces of distributed information knows only the (k−1) or less pieces of distributed information. There is a problem that cheating cannot be detected unless this condition is satisfied.

In the methods described in Non-patent Documents 3 and 4, cheating can be detected on condition that at least one correctly generated distributed information is included in distributed information used in a reconstruction process. However, a participant can only guarantee that distributed information distributed to himself is correct. That is, with respect to the reconstruction process in which the participant has not participated, he cannot determine whether or not correctly generated distributed information is included in distributed information used in that reconstruction process. Thus, a result of the reconstruction process cannot be relied on.

That is, there is a problem that, in the method capable of detecting cheating with a high probability even if (k−1) pieces of distributed information have been tampered by the cheater who knows k or more pieces of distributed information, the distributed information becomes significantly large data as compared with secret information. Further, there is a problem that when the participant has not participated in the reconstruction process, he cannot determine whether or not there is a tampered value in the distributed information used in the reconstruction process.

Then, it is an object of the present invention to provide a distributed information generation apparatus, a reconstruction apparatus, a reconstruction result verification apparatus, a secret information distribution system, a distributed information generation method, a reconstruction method, a reconstruction result verification method, a secret information distribution method, a distributed information generation program, a reconstruction program, a reconstruction result verification program, and a secret information distribution program which can increase the probability of detecting tampering of distributed information even if a cheater holds pieces of the distributed information of the number equal to a threshold or more, and reduces the size of the distributed information relative to secret information more than in a conventional art.

It is also an object of the present invention to provide a reconstruction result verification apparatus, a secret information distribution system, a reconstruction result verification method, a secret information distribution method, a reconstruction result verification program, and a secret information distribution program capable of verifying a reconstruction process result even if a participant has not participated in a reconstruction process.

A distributed information generation apparatus according to a first aspect of the present invention is the distributed information generation apparatus that distributes secret information. The distributed information generation apparatus includes:

a secret information distribution apparatus;
a distributed secret information distribution apparatus; and
a distribution input means that receives secret information s, a threshold k, a number of distributed information n, and a predetermined fixed value t;

the secret information distribution apparatus including:
a first random number generation apparatus that generates n first random numbers which are different from the fixed value t and are different from one another, and outputs the generated first random numbers;
a first distribution polynomial generation apparatus that generates a (k−1)-degree polynomial F by embedding the secret information s in the (k−1)-degree polynomial F; and
a distributed information output apparatus that enters the respective first random numbers into the polynomial F to output values and also enters the fixed value t into the polynomial F to output a value;

the distributed secret information distribution apparatus including:
a second random number generation apparatus that generates n second random numbers that are different from one another, and outputs the generated second random numbers;
a second distribution polynomial generation apparatus that generates a (k−1)-degree polynomial G by embedding the output of the distributed information output apparatus in the (k−1)-degree polynomial G, the output of the distributed information output apparatus being the output when the fixed value t is entered into the polynomial F; and
a distributed information output apparatus that enters the respective second random numbers into the polynomial G to output values.

According to a second aspect of the present invention, in the distributed information generation apparatus according to the first aspect, the distribution input means may receive parameters L of the number that is less than or equal to k−1; the first distribution polynomial generation apparatus may generate the polynomial F by embedding the secret information s in a value obtained by connecting coefficients of terms from a constant term to an (L−1)-degree term of the polynomial F; and the second distribution polynomial generation apparatus may generate the polynomial G in which the output when the fixed value t is entered into the polynomial F is set to a constant term. With that arrangement, the size of the distributed information can be further reduced.

According to a third aspect of the present invention, in the distributed information generation apparatus according to the first aspect, the first distribution polynomial generation apparatus may generate the polynomial F in which the secret information s is set to the constant term, when the number of the parameters L is 1, for example, instead of generating the polynomial F by embedding the secret information s in a value obtained by connecting coefficients of terms from the constant term to the (L−1)-degree term of the polynomial F. With that arrangement, information on the secret information does not leak from the number of (k−1) pieces or less of the distributed information.

According to a fourth aspect of the present invention, in the distributed information generation apparatus according to the first aspect, the first random number generation apparatus may generate n constants that are different from the fixed value t and are different from one another, as the first random numbers, or the second random number generation apparatus may generate n constants that are different from one another, as the second random numbers. With that arrangement, the size of the distributed information can be further reduced.

According to a fifth aspect of the present invention, the distributed information generation apparatus according to any one of the first through fourth aspects may include storage apparatuses that associate and store the first random numbers output by the first random number generation apparatus and the values output by the distributed information output apparatus when the first random numbers are entered into the polynomial F, and associate and store the second random numbers output by the second random number generation apparatus and the values output by the distributed information output apparatus when the second random numbers are entered into the polynomial G. With that arrangement, the outputs of the distributed information generation apparatus can be stored in the storage apparatuses.

As a reconstruction apparatus according to a sixth aspect of the present invention, there is provided the reconstruction apparatus including:

a reconstruction input means that receives a threshold k and a predetermined fixed value t;

a polynomial reconstruction apparatus that receives values $v_1$ through $v_k$ and values $r_1$ through $r_k$ that are different from one another, thereby outputting a (k−1)-degree polynomial F' that respectively supplies the values $v_1$ through $v_k$ when the values $r_1$ through $r_k$ are entered;

a distributed secret information reconstruction apparatus that receives values $w_1$ through $w_k$ and values $x_1$ through $x_k$ that are different from one another, thereby outputting a (k−1)-degree polynomial G' that respectively supplies the values $w_1$ through $w_k$ when the values $x_1$ through $x_k$ are entered; and a cheating detection apparatus that outputs a value embedded in the polynomial F' as the secret information when a value embedded in the polynomial G' is equal to an output obtained by entering the fixed value t into the polynomial F', and outputs information indicating detection of cheating when the value embedded in the polynomial G' is not equal to the output obtained by entering the fixed value t into the polynomial F'. More specifically, the reconstruction apparatus according to the sixth aspect of the present invention is the reconstruction apparatus that reconstructs the secret information based on outputs of a distributed information generation apparatus that distributes the secret information. The reconstruction apparatus includes:

storage apparatuses that store the outputs of the distributed information generation apparatus according to the first aspect;

the reconstruction input means for receiving the threshold k and the predetermined fixed value t;

the polynomial reconstruction apparatus that receives from the storage apparatuses k pairs of the first random numbers output by the secret information distribution apparatus of the distributed information generation apparatus according to the first aspect and the outputs when the first random numbers are entered into the (k−1)-degree polynomial F generated by the secret information distribution apparatus, thereby generating the (k−1)-degree polynomial F' that respectively supplies the outputs $v_1$ through $v_k$ when the received first random numbers indicated by $r_1$ through $r_k$ are entered, the outputs $v_1$ through $v_k$ being the outputs when the first random numbers $r_1$ through $r_k$ are entered into the polynomial F;

the distributed secret information reconstruction apparatus that receives from the storage apparatuses k pairs of the second random numbers output by the distributed secret information distribution apparatus of the distributed information generation apparatus according to the first aspect and the outputs when the second random numbers are entered into the (k−1)-degree polynomial G generated by the distributed secret information distribution apparatus, thereby generating the (k−1)-degree polynomial G' that respectively supplies the outputs $w_1$ through $w_k$ when the received second random numbers indicated by $x_1$ through $x_k$ are entered, the outputs $w_1$ through $w_k$ being the outputs when the second random numbers $x_1$ through $x_k$ are entered into the polynomial G; and the cheating detection apparatus that outputs the value embedded in the polynomial F' as the secret information when the value embedded in the polynomial G' is equal to the output obtained by entering the fixed value t into the polynomial F', and outputs information indicating detection of cheating when the value embedded in the polynomial G' is not equal to the output obtained by entering the fixed value t into the polynomial F'.

According to a seventh aspect of the present invention, in the reconstruction apparatus according to the sixth aspect, the reconstruction input means receives parameters L of the number that is less than or equal to (k−1); and the cheating detection apparatus employs a constant term of the polynomial G' as the value embedded in the polynomial G', and employs a value obtained by connecting coefficients of terms from a constant term to an (L−1)-degree term of the polynomial F' as the secret information. More specifically, the storage apparatuses may store the outputs of the distributed information generation apparatus according to the second aspect;

the reconstruction input means may receive the parameters L of the number that is less than or equal to (k−1);

the polynomial reconstruction apparatus may receive from the storage apparatuses k pairs of the first random numbers output by the secret information distribution apparatus according to the second aspect and the outputs when the first random numbers are entered into the (k−1)-degree polynomial F generated by the secret information distribution apparatus, thereby generating the (k−1)-degree polynomial F';

the distributed secret information reconstruction apparatus may receive from the storage apparatuses k pairs of the second random numbers output by the distributed secret information distribution apparatus according to the second aspect and the outputs when the second random numbers are entered into the (k−1)-degree polynomial G generated by the distributed secret information distribution apparatus, thereby generating the (k−1)-degree polynomial G'; and the cheating detection apparatus may output the value obtained by connecting the coefficients of the terms from the constant term to an (L−1)-degree term of the polynomial F' as the secret information when the constant term of the polynomial G' is equal to the output obtained by entering the fixed value t into the polynomial F', and may output the information indicating detection of cheating when the constant term of the polynomial G' is not equal to the output. With that arrangement, the size of the distributed information can be further reduced.

According to an eighth aspect of the present invention, in the reconstruction apparatus according to the sixth aspect, the cheating detection apparatus employs the constant term of the polynomial G' as the value embedded in the polynomial G' and employs the constant term of the polynomial F' as the secret information. More specifically, the storage apparatuses may store the outputs of the distributed information generation apparatus according to the third aspect;

the polynomial reconstruction apparatus may receive from the storage apparatuses k pairs of the first random numbers output by the secret information distribution apparatus according to the third aspect and the outputs when the first random numbers are entered into the (k−1)-degree polynomial F generated by the secret information distribution apparatus, thereby generating the (k−1)-degree polynomial F'; and the cheating detection apparatus may output the constant term of the polynomial F' as the secret information when the constant term of the polynomial G' is equal to the output obtained by entering the fixed value t into the polynomial F', and may output the information indicating detection of cheating when the constant term of the polynomial G' is not equal to the output. With that arrangement, information on the secret information does not leak from the number of (k−1) pieces or less of the distributed information.

According to a ninth aspect of the present invention, in the reconstruction apparatus according to any one of the sixth through eighth aspects, the storage apparatuses may store the outputs of the distributed information generation apparatus according to the fourth aspect;

the polynomial reconstruction apparatus may receive the k pairs of the first random numbers output by the secret information distribution apparatus according to the fourth aspect and the outputs when the first random numbers are entered into the (k−1)-degree polynomial F generated by the secret information distribution apparatus, thereby generating the (k−1)-degree polynomial F';

the distributed secret information reconstruction apparatus may receive from the storage apparatuses the k pairs of the second random numbers output by the distributed secret information distribution apparatus according to the fourth aspect and the outputs when the second random numbers are entered into the (k−1)-degree polynomial G generated by the distributed secret information distribution apparatus, thereby generating the (k−1)-degree polynomial G'; and the polynomial reconstruction apparatus may receive the n constants that are different from the constant value t and are different from one another, as the first random numbers, or the distributed secret information reconstruction apparatus may receive the n constants that are different from one another, as the second random numbers. With that arrangement, the size of the distributed information can be reduced.

According to a tenth aspect of the present invention, in the reconstruction apparatus according to any one of the sixth through ninth aspects, preferably, the cheating detection apparatus outputs the polynomial F' in addition to each output content obtained by entering the fixed value t into the polynomial F', when the output content is equal to a value embedded in the polynomial G'. With that arrangement, a value output by the reconstruction apparatus can be verified.

A reconstruction result verification apparatus according to an eleventh aspect of the present invention receives a (k−1)-degree polynomial f and parameters r and v, and outputs information indicating that cheating has not been detected when the parameter v is equal to a value obtained by entering the parameter r into the polynomial f and outputs information indicating detection of cheating when the parameter v is not equal to the value. More specifically, the reconstruction result verification apparatus according to the eleventh aspect of the present invention is the reconstruction result verification apparatus that verifies a value output by a reconstruction apparatus that reconstructs secret information. The reconstruction result verification apparatus receives the (k−1)-degree polynomial f output by the reconstruction apparatus and receives from the storage apparatuses that store the outputs of the distributed information generation apparatus according to any one of the first to fifth aspects a pair of the first random number r output by the secret information distribution apparatus according to any one of the first to fifth aspects and the output v when the first random number r is entered into the polynomial F generated by the secret information distribution apparatus according to any one of the first to fifth aspects, outputs the information indicating that cheating has not been detected when the received value v is equal to the output obtained by entering the first random number r into the polynomial f and outputs the information indicating detection of cheating when the received value v is not equal to the output.

A secret information distribution system according to a twelfth aspect of the present invention includes:
the distributed information generation apparatus according to any one of the first to fifth aspects; and
the reconstruction apparatus according to any one of the sixth to tenth aspects.

Preferably, the secret information distribution system according to a thirteenth aspect of the present invention includes the reconstruction result verification apparatus according to the eleventh aspect. With that arrangement, a value output by the reconstruction apparatus can be verified.

A distributed information generation method according to a fourteenth aspect of the present invention is the distributed information generation method of distributing secret information. The method includes:

a distribution input step of receiving secret information s, a threshold k, a number of distributed information n, and a predetermined fixed value t;

a secret information distribution step; and
a distributed secret information distribution step;
the secret information distribution step including:
a first random number generation step of generating n first random numbers that are different from the fixed value t and are different from one another, and outputting the generated first random numbers;

a first distribution polynomial generation step of generating a (k−1)-degree polynomial F by embedding the secret information s in the (k−1)-degree polynomial F; and a distributed information output step of entering the respective first random numbers into the polynomial F to output values and also entering the fixed value t into the polynomial F to output a value;

the distributed secret information distribution step including:

a second random number generation apparatus step of generating n second random numbers that are different from one another, and outputting the generated second random numbers;

a second distribution polynomial generation step of generating a (k−1)-degree polynomial G by embedding the output of the distributed information output step in the (k−1)-degree polynomial G, the output of the distributed information output step being the output when the fixed value t is entered into the polynomial F; and a distributed information output step of entering the respective second random numbers into the polynomial G to output values.

According to a fifteenth aspect of the present invention, in the distribution input step according to the fourteenth aspect, parameters L of a number that is less than or equal to k−1 may be received;

in the first distribution polynomial generation step, the polynomial F may be generated by embedding the secret information s in a value obtained by connecting coefficients of terms from a constant term to an (L−1)-degree term of the polynomial F; and in the second distribution polynomial generation step, the polynomial G in which the output when the fixed value t is entered into the polynomial F is set to a constant term may be generated. With that arrangement, the size of the distributed information can be further reduced.

According to a sixteenth aspect of the present invention, when the number of the parameters L is 1, for example, in the first distribution polynomial generation step according to the fifteenth aspect, the polynomial F in which the secret information s is set to the constant term may be generated, instead of generating the polynomial F by embedding the secret information s in the value obtained by connecting the coefficients of the terms from the constant term to the (L−1)-degree term of the polynomial F. With that arrangement, information on the secret information does not leak from the number of (k−1) pieces or less of the distributed information.

According to a seventeenth aspect of the present invention, in the first random number generation step in any one of the fourteenth to sixteenth aspects, n constants that are different from the fixed value t and are different from one another may be generated and output, as the first random numbers, or in the second random number generation step, n constants that are different from one another may be generated and output, as the second random numbers. With that arrangement, the size of the distributed information can be further reduced.

According to an eighteenth aspect of the present invention, the first random numbers output in the first random number generation step in any one of the fourteenth to seventeenth aspects and the values output in the distributed information output step when the first random numbers are entered into the polynomial F may be associated and stored, and the second random numbers output in the second random number generation step and the values output in the distributed information output step when the second random numbers are entered into the polynomial G may be associated and stored in storage apparatuses. With that configuration, outputs in the distributed information generation method can be stored in the storage apparatuses.

A reconstruction method according to a nineteenth aspect of the present invention is the reconstruction method for reconstructing secret information. In the method, a threshold k and a predetermined fixed value t are received;

values $v_1$ through $v_k$ and values $r_1$ through $r_k$ that are different from one another are received, thereby outputting a (k−1)-degree polynomial F' that respectively supplies the values $v_1$ through $v_k$ when the values $r_1$ through $r_k$ are entered;

values $w_1$ through $w_k$ and values $x_1$ through $x_k$ that are different from one another are received, thereby outputting a (k−1)-degree polynomial G' that respectively supplies the values $w_1$ through $w_k$ when the values $x_1$ through $x_k$ are entered; and a value embedded in the polynomial F' is output as the secret information when a value embedded in the polynomial G' is equal to an output obtained by entering the fixed value t into the polynomial F', and information indicating detection of cheating is output when the value embedded in the polynomial G' is not equal to the output obtained by entering the fixed value t into the polynomial F'. More specifically, the method includes:

a reconstruction input step of receiving the threshold k and the predetermined fixed value t;

a polynomial restoration step of receiving, from storage apparatuses that store the contents output in the distributed information generation method in the fourteenth aspect, k pairs of the first random numbers output in the secret information distribution step in the fourteenth aspect and the outputs when the first random numbers are entered into the (k−1)-degree polynomial F generated in the secret information distribution step in the fourteenth aspect, thereby generating the (k−1)-degree polynomial F' that respectively supplies the outputs $v_1$ through $v_k$ when the received first random numbers indicated by $r_1$ through $r_k$ are entered, the outputs $v_1$ through $v_k$ being the outputs when the first random numbers $r_1$ through $r_k$ are entered into the polynomial F;

a distributed secret information reconstruction step of receiving from the storage apparatuses k pairs of the second random numbers output in the distributed secret information distribution step in the fourteenth aspect and the outputs when the second random numbers are entered into the (k−1)-degree polynomial G generated in the distributed secret information distribution step in the fourteenth aspect, thereby generating the (k−1)-degree polynomial G' that respectively supplies the outputs $w_1$ through $w_k$ when the received second random numbers indicated by $x_1$ through $x_k$ are entered, the outputs $w_1$ through $w_k$ being the outputs when the second random numbers $x_1$ through $x_k$ are entered into the polynomial G; and a cheating detection step of outputting the value embedded in the polynomial F' as the secret information when the value embedded in the polynomial G' is equal to the output obtained by entering the fixed value t into the polynomial F', and outputting the information indicating detection of cheating when the value embedded in the polynomial G' is not equal to the output obtained by entering the fixed value t into the polynomial F'.

According to a twentieth of the present invention, in the reconstruction input step according to the nineteenth aspect, parameters L of the number that is less than or equal to (k−1) are received; and in the cheating detection step, a constant term of the polynomial G' is employed as the value embedded in the polynomial G', and a value obtained by connecting coefficients of terms from a constant term to an (L−1)-degree term of the polynomial F' is employed as the secret information. More specifically, parameters L of the number that is less than or equal to (k−1) may be input;

in the polynomial reconstruction step, k pairs of the first random numbers output in the secret information distribution step in the fifteenth aspect and the outputs when the first random numbers are entered into the (k−1)-degree polynomial F generated in the secret information distribution step in the fifteenth aspect may be received from the storage apparatuses that store the contents output in the distributed information generation method in the fifteenth aspect, thereby generating the (k−1)-degree polynomial F';

in the distributed secret information reconstruction step, k pairs of the second random numbers output in the distributed secret information distribution step in the fifteenth aspect and the outputs when the second random numbers are entered into the (k−1)-degree polynomial G generated in the distributed secret information distribution step in the fifteenth aspect may be received from the storage apparatuses, thereby generating the (k−1)-degree polynomial G'; and in the cheating detection step, the value obtained by connecting the coefficients of the terms from the constant term to the (L−1)-degree term of the polynomial F' may be output as the secret information when the constant term of the polynomial G' is equal to the output obtained by entering the fixed value t into the polynomial F', and the information indicating detection of cheating may be output when the constant term of the polynomial G' is not equal to the output.

With that arrangement, the size of the distributed information can be further reduced.

According to a twenty-first aspect of the present invention, the constant term of the polynomial G' is employed as the value embedded in the polynomial G' and a constant term of a polynomial F' is employed as the secret information in the cheating detection step. More specifically, in the polynomial reconstruction step in the nineteenth aspect, k pairs of the first random numbers output in the secret information distribution step in the sixteenth aspect and the outputs when the first random numbers are entered into the (k−1)-degree polynomial F generated in the secret information distribution step in the sixteenth aspect may be received from the storage apparatuses that store the contents output in the distributed information generation method in the sixteenth aspect, thereby generating the (k−1)-degree polynomial F'; and in the cheating detection step, the constant term of the polynomial F' may be output as the secret information when the constant term of the polynomial G' is equal to an output obtained by entering the fixed value t into the polynomial F', and the information indicating detection of cheating may be output when the constant term of the polynomial G' is not equal to the output. With that arrangement, information on the secret information does not leak from the number of (k−1) pieces or less of the distributed information.

According to a twenty-second aspect of the present invention, in the polynomial reconstruction step in any one of the nineteenth to twenty-first aspects, k pairs of the first random numbers output in the secret information distribution step in the seventeenth aspect and the outputs when the first random numbers are entered into the (k−1)-degree polynomial F generated by the secret information distribution step in the seventeenth aspect may be received from the storage apparatuses that store the contents output in the distributed information generation method in the seventeenth aspect, thereby generating the (k−1)-degree polynomial F';

in the distributed secret information reconstruction step, k pairs of the second random numbers output in the distributed secret information distribution step in the seventeenth aspect and the outputs when the second random numbers are entered into the (k−1)-degree polynomial G generated in the distributed secret information distribution step in the seventeenth aspect may be received from the storage apparatuses, thereby generating a (k−1)-degree polynomial G'; and in the polynomial reconstruction step, n constants that are different from the constant value t and are different from one another may be received as the first random numbers, or in the distributed secret information reconstruction step, n constants that are different from one another may be received as the second random numbers. With that arrangement, the size of the distributed information can be further reduced.

According to a twenty-third aspect of the present invention, in the cheating detection step in any one of the nineteenth to twenty-first aspects, preferably, the polynomial F' is output in addition to each output content obtained by entering the fixed value t into the polynomial F', when the output content is equal to a value embedded in the polynomial G'. With that arrangement, a value output in the reconstruction method can be verified.

A reconstruction result verification method according to a twenty-fourth aspect of the present invention is the reconstruction result verification method for verifying reconstructed secret information. There is provided the reconstruction result verification method in which a (k−1)-degree polynomial f is received as the restored secret information, a pair of a first random number r output in the secret information distribution step in any one of the fourteenth to eighteenth aspects and an output v when the first random number r is entered into the polynomial F generated in the secret information distribution step in any one of the fourteenth to eighteenth steps are received from the storage apparatuses that store the contents output in the distributed information generation method in any one of the fourteenth to eighteenth aspects, information indicating that cheating has not been detected is output when the received value v is equal to an output obtained by entering the first random number r into the polynomial f, and information indicating detection of cheating is output when the received value v is not equal to the output.

The secret information distribution method according to a twenty-fifth aspect of the present invention includes:

the distributed information generation method in any one of the fourteenth to eighteenth aspects; and the reconstruction method in any one of the nineteenth to twenty-third aspects.

According to a twenty-sixth aspect of the present invention, preferably, the secret information distribution method according to the twenty-fifth aspect includes the reconstruction result verification method in the twenty-fourth aspect. With that configuration, a value output in the reconstruction method can be verified.

A distributed information generation program according to a twenty-seventh aspect of the present invention is the distributed information generation program for distributing secret information. The distributed information generation program causes a computer to execute:

a distribution input process that receives secret information s, a threshold k, a number of distributed information n, and a predetermined fixed value t;

a secret information distribution process; and a distributed secret information distribution process;

in the secret information distribution process, the computer is caused to execute:

a first random number generation process that generates n first random numbers which are different from the fixed value t and are different from one another, and outputs the generated first random numbers;

a first distribution polynomial generation process that generates a (k−1)-degree polynomial F by embedding the secret information s in the (k−1)-degree polynomial F; and a distributed information output process that enters the respective first random numbers into the polynomial F to output values and also enters the fixed value t into the polynomial F to output a value;

in the distributed secret information distribution process, the computer is caused to execute:

a second random number generation process that generates n second random numbers which are different from one another, and outputs the generated second random numbers;

a second distribution polynomial generation process that generates a (k−1)-degree polynomial G by embedding the output of the distributed information output process in the (k−1)-degree polynomial G, the output of the distributed information output process being the output when the fixed value t is entered into the polynomial F; and a distributed distributed information output process that enters the respective second random numbers to the polynomial G to output values.

According to a twenty-eighth aspect of the present invention, the program according to the twenty-seventh aspect may cause the computer to execute:

a process of receiving parameters L of the number that is less than or equal to k−1 in the distribution input process;

a process of generating the polynomial F by embedding the secret information s in a value obtained by connecting coefficients of terms from a constant term to an (L−1)-degree term of the polynomial F, in the first distribution polynomial generation process; and a process of generating the polynomial G in which the output when the fixed value t entered into the polynomial F is set to a constant term, in the second distribution polynomial generation process. With that arrangement, the size of the distributed information can be further reduced.

According to a twenty-ninth aspect of the present invention, the program according to the twenty-eighth aspect may cause the computer to execute:

a process of generating the polynomial F in which the secret information s is set to the constant term when the number of the parameters L is 1, for example, instead of generating the polynomial F by embedding the secret information s in a value obtained by connecting coefficients of terms from the constant term to the (L−1)-degree term of the polynomial F, in the first distribution polynomial generation process. With that arrangement, information on the secret information does not leak from (k−1) pieces or less of the distributed information.

According to a thirtieth aspect of the present invention, the program according to any one of the twenty-seventh to twenty-ninth aspects may cause the computer to execute:

a process of generating n constants that are different from the fixed value t and are different from one another, as the first random numbers in the first random number generation process, or a process of generating n constants that are different from one another, as the second random numbers in the second random number generation process. With that arrangement, the size of the distributed information can be further reduced.

According to a thirty-first aspect of the present invention, the program according to any one of the twenty-seventh to thirtieth aspects may cause the computer to execute:

a process of associating and storing in storage apparatuses the first random numbers output in the first random number generation process and the outputs in the distributed information output process when the first random numbers are entered into the polynomial F, and associating and storing in the storage apparatuses the second random numbers output in the second random number generation process and the outputs in the distributed distributed information output process when the second random numbers are entered into the polynomial G. With that arrangement, outputs when the distributed information generation program is executed can be stored in the storage apparatuses.

A reconstruction program according to a thirty-second aspect of the present invention is the reconstruction program for reconstructing secret information. The program causes a computer to execute:

a reconstruction input process of receiving a threshold k and a predetermined fixed value t;

a polynomial reconstruction process of receiving values $v_1$ through $v_k$ and values $r_1$ through $r_k$ that are different from one another, thereby outputting a (k−1)-degree polynomial F' that respectively supplies the value $v_1$ through $v_k$ when the values $r_1$ through $r_k$ are entered;

a distributed secret information reconstruction process of receiving values $w_1$ through $w_k$ and values $x_1$ through $x_k$ that are different from one another, thereby outputting a (k−1)-degree polynomial G' that respectively supplies the values $w_1$ through $w_k$ when the values $x_1$ through $x_k$ are entered; and a cheating detection process of outputting a value embedded in the polynomial F' as the secret information when a value embedded in the polynomial G' is equal to an output obtained by entering the fixed value t into the polynomial F', and outputting information indicating detection of cheating when the value embedded in the polynomial G' is not equal to the output obtained by entering the fixed value t into the polynomial F'. More specifically, the reconstruction program according to the thirty-second aspect of the present invention causes the computer to execute:

the reconstruction input process of receiving the threshold k and the predetermined fixed value t;

the polynomial reconstruction process of receiving from storage apparatuses that store the contents output by the distributed information generation program in the twenty-seventh aspect k pairs of the first random numbers output in the secret information distribution process in the twenty-seventh aspect and the outputs when the first random numbers are entered into the (k−1)-degree polynomial F generated by the secret information distribution process in the twenty-seventh aspect, thereby generating the (k−1)-degree polynomial F' that respectively supplies the outputs $v_1$ through $v_k$ when the received first random numbers indicated by $r_1$ through $r_k$ are entered, the outputs $v_1$ through $v_k$ being the outputs when the first random numbers $r_1$ through $r_k$ are entered into the polynomial F;

the distributed secret information reconstruction process of receiving from the storage apparatuses k pairs of the second random numbers output in the distributed secret information distribution process in the twenty-seventh aspect and the outputs when the second random numbers are entered into the (k−1)-degree polynomial G generated in the distributed secret information distribution process in the twenty-seventh aspect, thereby generating the (k−1)-degree polynomial G' that respectively supplies the outputs $w_1$ through $w_k$ when the received second random numbers indicated by $x_1$ through $x_k$ are entered, the outputs $w_1$ through $w_k$ being the outputs when the second random numbers $x_1$ through $x_k$ are entered into the polynomial G; and the cheating detection process of outputting the value embedded in the polynomial F' as the secret information when the value embedded in the polynomial G' is equal to the output obtained by entering the fixed value t into the polynomial F', and outputting the information indicating detection of cheating when the value embedded in the polynomial G' is not equal to the output obtained by entering the fixed value t into the polynomial F'.

According to a thirty-third aspect of the present invention, the program according to the thirty-second aspect may cause the computer to:

receive parameters L of the number that is less than or equal to (k−1) in the reconstruction input process; and employ a constant term of the polynomial G' as the value embedded in the polynomial G', and employ a value obtained by connecting coefficients of terms from a' constant term to an (L−1)-degree term of the polynomial F' as the secret information, in the cheating detection process. More specifically, the program may cause the computer to:

receive the parameters L of the number that is less than or equal to (k−1) in the reconstruction input process;

execute a process of receiving from the storage apparatuses that store the contents output by the distributed information generation program in the twenty-eighth aspect k pairs of the first random numbers output in the secret information distribution process in the twenty-eighth aspect and the outputs when the first random numbers are entered into the (k−1) degree polynomial F generated by the secret information distribution process as in the twenty-eighth aspect, thereby generating the (k−1)-degree polynomial F', in the polynomial reconstruction process;

execute a process of receiving from the storage apparatuses k pairs of the second random numbers output in the distributed secret information distribution process in the twenty-eighth aspect and the outputs when the second random numbers are entered into the (k−1) degree polynomial G generated in the distributed secret information distribution process in the twenty-eighth aspect, thereby generating the (k−1)-degree polynomial G', in the distributed secret information reconstruction process; and execute a process of outputting the value obtained by connecting the coefficients of the terms from the constant term to the (L−1)-degree term of the polynomial F' as the secret information when the constant term of the polynomial G' is equal to the output obtained by entering the fixed value t to the polynomial F', and outputting the information indicating detection of cheating when the constant term of the polynomial G' is not equal to the output, in the cheating detection process. With that arrangement, the size of the distributed information can be further reduced.

According to a thirty-fourth aspect of the present invention, the program according to the thirty-third aspect of the present invention may cause the computer to execute:

a process of receiving from the storage apparatuses that store the contents output by the distributed information generation program in the twenty-ninth aspect k pairs of the first random numbers output in the secret information distribution process in the twenty-ninth aspect and the outputs when the first random numbers are entered into the (k−1)-degree polynomial F generated by the secret information distribution process in the twenty-ninth aspect, thereby generating a (k−1)-degree polynomial F', in the polynomial reconstruction process; and a process of outputting a constant term of the polynomial F' as the secret information when the constant term of the polynomial G' is equal to an output obtained by entering the fixed value t into the polynomial F', and outputting the information indicating detection of cheating when the constant term of the polynomial G' is not equal to the output, in the cheating detection process. With that arrangement, information on the secret information does not leak from (k−1) or less pieces of the distributed information.

According to a thirty-fifth aspect of the present invention, the program according to any one of the thirty-second through thirty-fourth aspects may cause the computer to execute:

a process of receiving from the storage apparatuses that store the contents output by the distributed information generation program in the thirtieth aspect k pairs of the first random numbers output in the secret information distribution process in the thirtieth aspect and the outputs when the first random numbers are entered into the (k−1)-degree polynomial F generated by the secret information distribution process in the thirtieth aspect, thereby generating a (k−1)-degree polynomial F', in the polynomial reconstruction process;

a process of receiving from the storage apparatuses k pairs of the second random numbers output by the distributed secret information distribution process in the thirtieth aspect and the outputs when the second random numbers are entered into the (k−1)-degree polynomial G generated by the distributed secret information distribution process in the thirtieth aspect, thereby generating a (k−1)-degree polynomial G', in the distributed secret information reconstruction process; and a process of receiving n constants that are different from the constant value t and are different from one another as the first random numbers in the polynomial reconstruction process, or receiving n constants that are different from one another, as the second random numbers, in the distributed secret information reconstruction process. With that arrangement, the size of the distributed information can be further reduced.

According to a thirty-sixth aspect of the present invention, preferably, the program according to any one of the thirty-second through thirty-fifth aspects causes the computer to execute a process of outputting the polynomial F' in addition to each output content obtained by entering the fixed value t into the polynomial F', when the output content is equal to a value embedded in the polynomial G', in the cheating detection process. With that arrangement, a value output when the reconstruction program is executed can be verified.

A reconstruction result verification program according to the thirty-sixth aspect of the present invention is the recon-
struction result verification program for verifying reconstructed secret information. The program causes a computer to execute:

a process of receiving a (k−1)-degree polynomial f as the reconstructed secret information and receiving from the storage apparatuses that store the contents output by the distributed information generation program in any one of the twenty-seventh to thirty-first aspects a pair of a first random number r output by the secret information distribution process in any one of the twenty-seventh to thirty-first aspects and an output v when the first random number r is entered into the polynomial F generated by the secret information distribution process in any one of the twenty-seventh to thirty-first aspects, outputting information indicating that cheating has not been detected when the received value v is equal to an output obtained by entering the first random number r into the polynomial f, and outputting information indicating detection of cheating when the received value v is not equal to the output.

In a secret information distribution program according to the thirty-sixth aspect of the present invention, there is provided the secret information distribution program including:

the distributed information generation program in any one of the twenty-seventh to thirty-first aspects; and the reconstruction program as set forth in any one of the thirty-second to thirty-sixth aspects.

In a secret information distribution program according to the thirty-seventh aspect of the present invention, there is provided the secret information distribution program including:

the distributed information generation program in any one of the twenty-seventh to thirty-first aspects;

the reconstruction program as set forth in any one of the thirty-second to thirty-sixth aspects; and the reconstruction verification program in the thirty-seventh aspects.

In the secret information distribution system according to the present invention, a method that uses a (k−1)-degree polynomial (refer to Non-patent Documents 1 and 2) may be used as a (k,n) threshold scheme, for example.

A secret information distribution system according to the present invention is the secret information distribution system constituted from a distributed information generation apparatus, a reconstruction apparatus, a reconstructed information verification apparatus, and a plurality of storage apparatuses, for example. The distributed information generation system receives secret information s, a threshold k, and a number of distributed information n to generate sets of random numbers of the number of the distributed information, which are different from a certain fixed value (hereinafter referred to as a fixed value "T") and are different from one another, (hereinafter referred to as a "random number A") and sets of random numbers of the number of the distributed information, which are different to one another (hereinafter referred to as a "random number set B"). The distributed information generation apparatus generates distributed information on secret information for each element in the random number set A and the fixed value T by using a random (k−1)-degree polynomial f and stores the generated polynomial in storage apparatuses that store the corresponding elements of the random number set A. The distributed information generation apparatus generates distributed information on f(T) for each element in the random number set B and by using a (k−1)-degree polynomial and stores the generated polynomial in storage apparatuses that store the corresponding elements of the random number set B. The reconstruction apparatus reads out from k of the storage apparatuses the elements of the random number set A and the elements of the random number set B, the distributed information on the secret information for the random number set A and the distributed information on a value f(T) for the random number set B, stored in the respective k storage apparatuses. The reconstruction apparatus reconstructs the value f(T) reconstructed from the distributed information on the value f(T) for the random number set B of the threshold number of the random numbers (the value obtained by the reconstruction being hereinafter referred to as a value "$f_T'$"). The reconstruction apparatus reconstructs the polynomial f from the distributed information on the secret information for the random number set A of the threshold number of the random numbers (the polynomial obtained by the reconstruction being hereinafter referred to as a polynomial "f'"). The reconstruction apparatus checks whether $(T, f_T')$ is a point on the reconstructed polynomial f'. When it is found that $(T, f_T')$ is the point on the polynomial f', the reconstruction apparatus outputs a value f(0) as the secret information and outputs the polynomial f as checking data. Otherwise, the reconstruction apparatus outputs a symbol indicating detection of cheating. The reconstructed information verification apparatus receives the polynomial f on a data set on the secret information and reads out an element r of the random number set A stored in one of the storage apparatuses and distributed information $v_r$ on the secret information for the element of the random number set A. Then, when $f(r)=v_r$ is satisfied, the reconstructed information verification apparatus outputs the value f(0). Otherwise, the reconstructed information verification apparatus outputs the symbol indicating detection of cheating. Each of the storage apparatuses includes a system that stores the data set element for the random number set A, data set element for the random number set B, distributed information on the secret information for the element of the random number set A, and distributed information on the distributed information on the secret information for the fixed value for the element of the random number set B. By adopting such a configuration and properly selecting the sizes of the data sets for the random number sets A and B, the objects of the present invention can be achieved.

According to the present invention, even if cheaters hold distributed information of the number that is equal to or more than the threshold, the probability of detecting tampering of the distributed information can be increased. The size of the distributed information on the secret information can be reduced more than in a conventional art. Further, according to the present invention, even if a participant did not participated in a reconstruction process, a reconstruction process result can be verified.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 8 is a flowchart showing an operation of the reconstruction result verification apparatus in the exemplary embodiment of the present invention.

PREFERRED MODES

Figure 1:
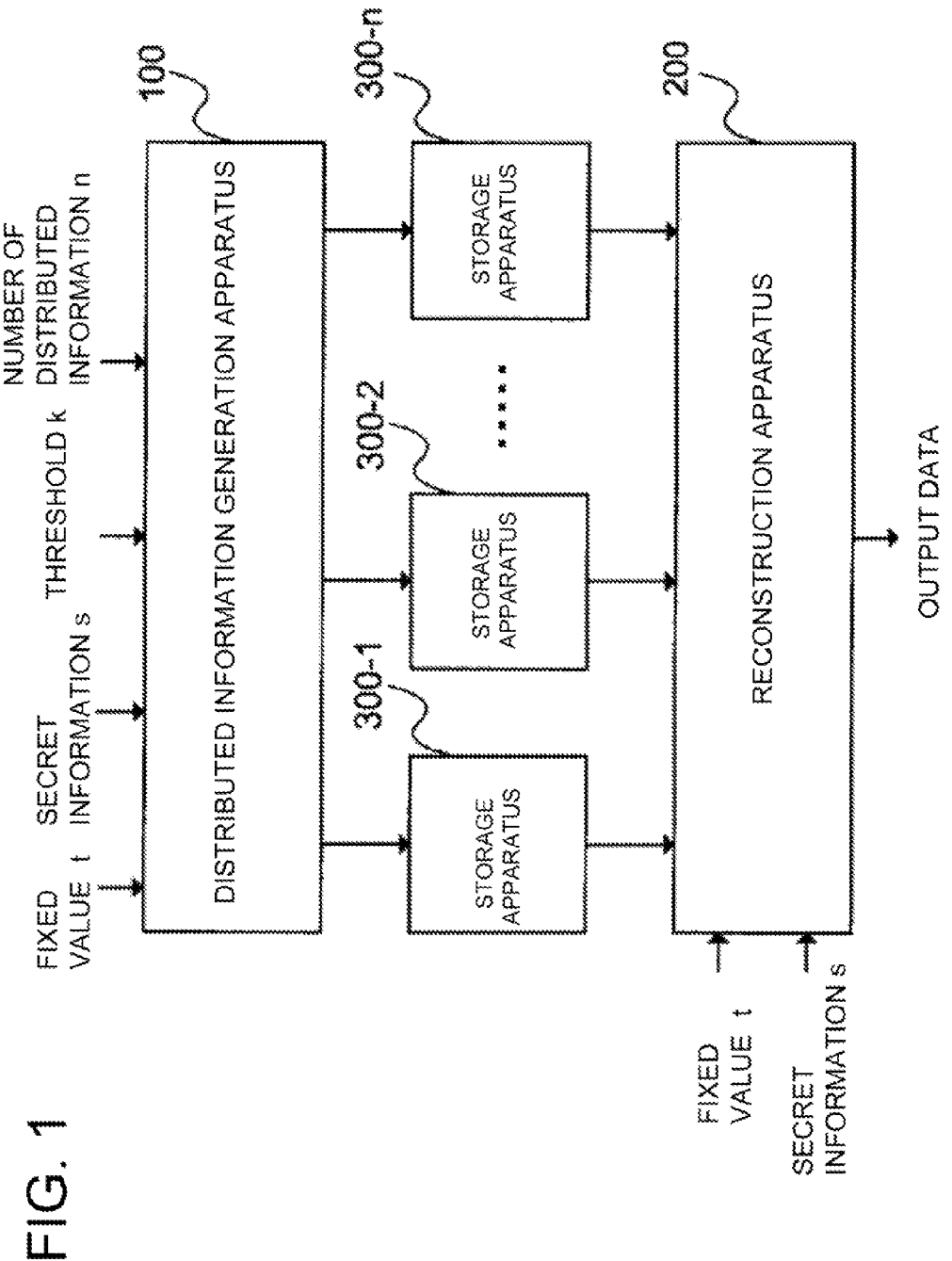
FIG. 1 is a block diagram showing an exemplary embodiment of a secret information distribution system according to the present invention.

Next, a best mode for carrying out the present invention will be described with reference to drawings. First, a description will be given to a case in which cheating on a certain participant by (k−1) cheaters or tampering of (k−1) pieces of distributed information is detected. FIG. 1 is a block diagram showing an exemplary embodiment of a secret information distribution system according to the present invention. Referring to FIG. 1, the secret information distribution system in this exemplary embodiment includes a distributed information generation apparatus 100, a reconstruction apparatus 200, and storage apparatuses 300-1 to 300-*n*.

The distributed information generation apparatus 100 generates a polynomial f that distributes secret information, thereby generating distributed information for first random numbers (hereinafter written as "distributed secret information"). The distributed information generation apparatus 100 generates a polynomial g that distributes a value f(t) obtained by entering a predetermined fixed value t into the generated polynomial f, thereby generating distributed information for second random numbers (hereinafter written as "distributed distributed secret information").

The storage apparatuses 300-1 to 300-*n* store the distributed secret information and distributed distributed secret information generated by the distributed information generation apparatus 100. For example, n pieces of the distributed secret information generated by the distributed information generation apparatus 100 are respectively stored in the storage apparatuses 300-1 to 300-*n*, and n pieces of the distributed distributed secret information generated by the distributed information generation apparatus 100 are respectively stored in the storage apparatuses 300-1 to 300-*n*. Each of the storage apparatuses 300-1 to 300-*n* is implemented by a hard disk apparatus of a server system or a storage apparatus such as a USB memory, for example.

The reconstruction apparatus 200 reconstructs the polynomial f, based on the distributed secret information stored in k storage apparatuses of the storage apparatuses 300-1 to 300-*n*. Further, the reconstruction apparatus 200 reconstructs the value f(t) based on the distributed distributed secret information stored in the k storage apparatuses of the storage apparatuses 300-1 to 300-*n*. In the following description, the reconstructed polynomial f may be written as a polynomial f', and the reconstructed value f(t) may be written as a value f'(t).

When the reconstructed value f'(t) is equal to a value obtained by entering the fixed value t into the polynomial f', the reconstruction apparatus 200 reconstructs the secret information. When the reconstructed value f'(t) is not equal to the value obtained by entering the fixed value t into the polynomial f', the reconstruction apparatus 200 determines that there was cheating, and outputs information indicating that there was cheating.

When the storage apparatuses 300-1 to 300-n are hard disk apparatuses of the server system, for example, the storage apparatuses 300-1 to 300-n may be connected to the distributed information generation apparatus 100 and the reconstruction apparatus 200 through a communication network. When the storage apparatuses 300-1 to 300-n are USB memories, for example, the storage apparatuses 300-1 to 300-n are USB-connected to the distributed information generation apparatus 100 and the reconstruction apparatus 200.

Figure 2:
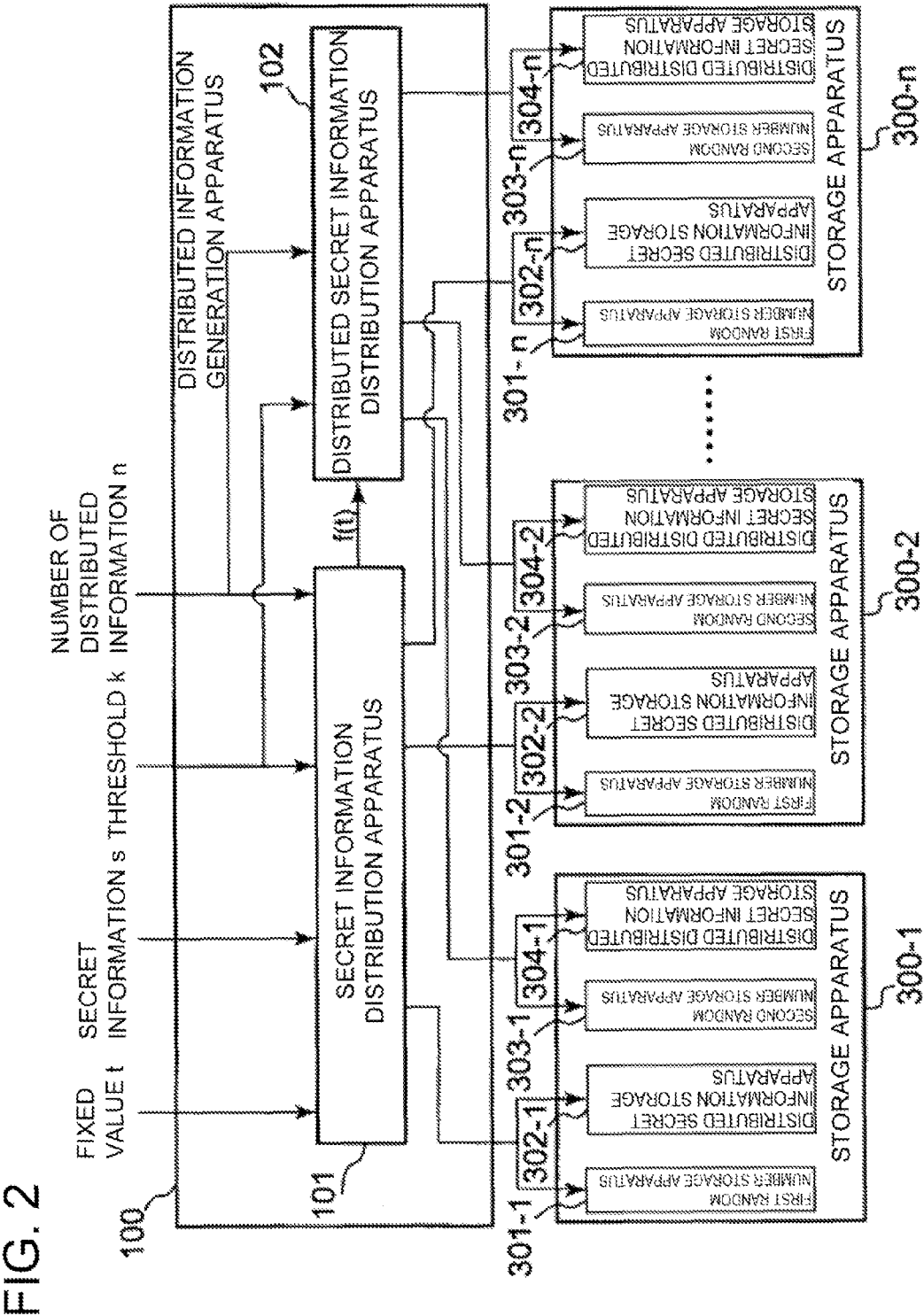
FIG. 2 is a block diagram showing configuration examples of a distributed information generation apparatus and storage apparatuses.

FIG. 2 is a block diagram showing configuration examples of the distributed information generation apparatus 100 and the storage apparatuses 300-1 to 300-n in FIG. 1. A configuration example of the distributed information generation apparatus 100 will be described, using FIG. 2. The distributed information generation apparatus 100 includes a secret information distribution apparatus 101 and a distributed secret information distribution apparatus 102.

The distributed information generation apparatus 100 receives secret information s which is the source of a secret information data set S, a threshold k, a fixed value t, and a number of distribution information n, and generates the sources of a distributed secret information data set BS as the distributed secret information, and the sources of a distributed distributed secret information data set BBS as the distributed distributed secret information. Then, the distributed information generation apparatus 100 stores in the storage apparatuses 300-1 to 300-n the sources of a first random number data set RA of first random numbers which are different from the fixed value t and are different from one another, sources of a second random number data set RB of second random numbers that are different from one another, sources of the distributed secret information data set BS, and sources of the distributed distributed secret information data set BBS.

As the first random number data set RA, a subset of the distributed secret information data set BS is used. Then, as the second random number data set RB, a subset of the distributed distributed secret information data set BBS is used. The secret information s, threshold k, fixed value t, and number of distributed information n are supplied through an input apparatus by a user or the like, for example.

The secret information distribution apparatus 101 receives the source s of the set S, threshold k, fixed value t, and number of distributed information n. The secret information distribution apparatus 101 stores the source of the first random number data set RA of first random numbers which are different from the fixed value t and are different from one another in each of the storage apparatuses 300-1 to 300-n. Herein, the source of the first random number data set RA stored in the storage apparatus 300-i (i=1, n) is indicated by $r_i$.

The secret information distribution apparatus 101 generates the polynomial f on the distributed secret information data set BS that distributes the secret information s, using a (k, n+1) threshold scheme described in Non-patent Document 1 or 2, for example. Then, the secret information distribution apparatus 101 enters the source $r_i$ of the first random number data set RA into the polynomial f, and stores a source $f(r_i)$ of the distributed secret information in the storage apparatus 300-i. The secret information distribution apparatus 101 stores the source $f(r_1)$ in the storage apparatus 300-1, stores the source $f(r_2)$ in the storage apparatus 300-2, and stores the source $f(r_n)$ in the storage apparatus 300-n. The secret information distribution apparatus 101 outputs the value f(t) to the distributed secret information distribution apparatus 102.

The secret information distribution apparatus 101 generates the polynomial f where the secret information s is embedded in coefficients or a constant term, for example, as a (k−1)-degree polynomial f.

The distributed secret information distribution apparatus 102 receives the output f(t) of the secret information distribution apparatus 101, threshold k, and number of distributed information n. The distributed secret information distribution apparatus 102 generates the sources of the second random number data set RB of second random numbers that are different from one another and stores the source of the second random number data set RB in each of the storage apparatuses 300-1 to 300-n. Herein, the source of the second random number data set RB stored in the storage apparatus 300-i (i=1, . . . , n) is indicated by $x_i$.

The distributed secret information distribution apparatus 102 generates the polynomial g on the distributed distributed secret information data set BBS that distributes the source f(t) of the distributed secret information data set BS, using the (k, n+1) threshold scheme described in Non-patent Document 1 or 2, for example. Then, the distributed secret information distribution apparatus 102 enters the source $x_i$ of the second random number data set RB into the polynomial g, and stores a source $g(x_i)$ of the distributed distributed secret information data set BBS in the storage apparatus 300-i. The distributed secret information distribution apparatus 102 stores the source $g(x_1)$ in the storage apparatus 300-1, stores the source $g(x_2)$ in the storage apparatus 300-2, and stores the source $g(x_n)$ in the storage apparatus 300-n, for example.

Figure 3:
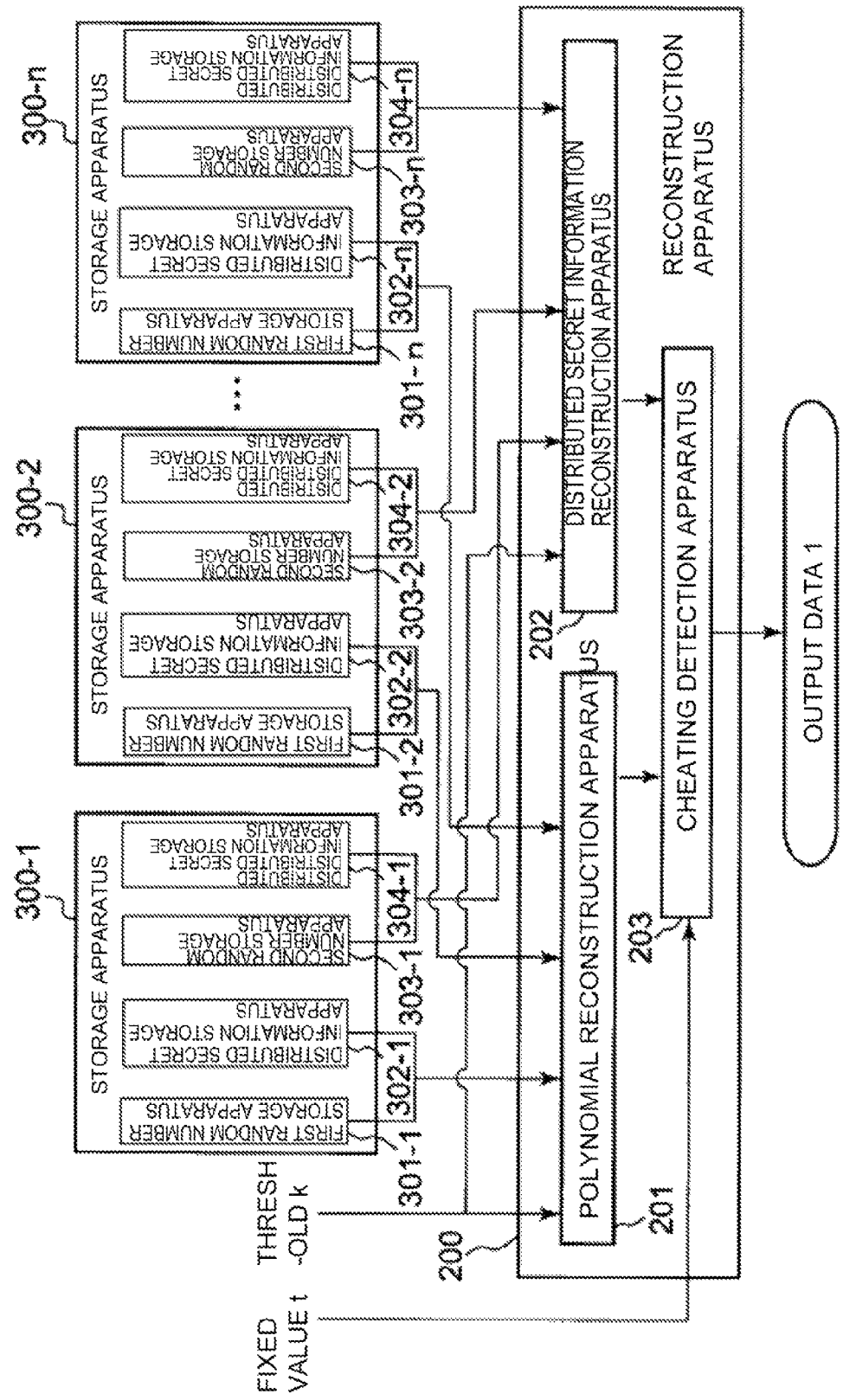
FIG. 3 is a block diagram showing configuration examples of each of a reconstruction apparatus and the storage apparatuses.

FIG. 3 is a block diagram showing configuration examples of the reconstruction apparatus 200 and the storage apparatuses 300-1 to 300-n. A configuration example of the reconstruction apparatus 200 will be described, using FIG. 3. The reconstruction apparatus 200 includes a polynomial reconstruction apparatus 201, a distributed secret information reconstruction apparatus 202, and a cheating detection apparatus 203.

The reconstruction apparatus 200 receives the fixed value t and the threshold k. Further, the reconstruction apparatus 200 reads from the k storage apparatuses of the storage apparatuses 300-1 to 300-n the sources of the first random number data set RA, second random number data set RB, distributed secret information data set BS, and distributed distributed secret information data set BBS stored in each of the k storage apparatuses. Then, the reconstruction apparatus 200 outputs the source of the secret information data set S and the (k−1)-degree polynomial f on the distributed secret information data set BS or a symbol indicating detection of cheating.

The polynomial reconstruction apparatus 201 receives the threshold k, reads from the k storage apparatuses of the storage apparatuses 300-1 to 300-n the sources of the first random number data set RA and the distributed secret information data set BS stored in the respective k storage apparatuses of the storage apparatuses 300-1 to 300-n, and outputs the source of a polynomial data set V.

For example, the polynomial reconstruction apparatus 201 obtains and outputs the (k−1)-degree polynomial f by a method of generating k simultaneous equations each obtained by substitution of the source of the first random number data set RA and the source of the distributed secret information data set BS in each storage apparatus to compute a solution to the k simultaneous equations, or the like.

The distributed secret information reconstruction apparatus 202 receives the threshold k, reads from the k storage apparatuses of the storage apparatuses 300-1 to 300-n the sources of the second random number data set RB and the distributed distributed secret information data set BBS or the like, and outputs the source of the distributed secret information data set BS.

For example, the distributed secret information reconstruction apparatus 202 obtains a (k−1)-degree polynomial g by a method of solving k simultaneous equations obtained by substitution of the sources of the second random number data set RB and the distributed distributed secret information data set BBS or the like, and outputs the source of the distributed secret information data set BS.

Assume that the source of the distributed secret information data set BS output by the distributed secret information reconstruction apparatus 202 is indicated by c. Then, when the sources of the second random number data set RB and the distributed distributed secret information data set BBS are not tampered, the source c is equal to the value f(t) output by the secret information distributed apparatus 101. When the sources of the first random number data set RA and the distributed secret information data set BS are not tampered, the polynomial f output by the polynomial reconstruction apparatus 201 is equal to the polynomial f generated by the secret information distribution apparatus 101. Accordingly, when the sources of the first random number data set RA, distributed secret information data set BS, second random number data set RB, and distributed distributed secret information data set BBS are not tampered, the value obtained by entering the fixed value t into the polynomial f output by the polynomial reconstruction apparatus 201 is equal to the source c of the distributed secret information data set BS output by the distributed secret information reconstruction apparatus 202.

The cheating detection apparatus 203 receives the fixed value t, source f of the polynomial data set V output by the polynomial reconstruction apparatus 201, and source c of the distributed secret information data set BS output by the distributed secret information reconstruction apparatus 202. Then, when f(t)=c is satisfied, the cheating detection apparatus 203 outputs a value f(0) as the secret information s, and outputs the polynomial f as checking data. When f(t)=c is not satisfied, the cheating detection apparatus 203 outputs the symbol indicating detection of cheating.

The configuration of the exemplary embodiment presented above denotes a configuration of the reconstruction apparatus 200 as shown below. The polynomial reconstruction apparatus 201 receives k pairs of the first random numbers output by the secret information distribution apparatus 101 and outputs when the first random numbers are entered into a (k−1)-degree polynomial F generated by the secret information distribution apparatus 101 and generates a (k−1)-degree polynomial F'. Assume that the received first random numbers are indicated by $r_1$ through $r_k$ and the outputs when the first random numbers $r_1$ through $r_k$ are entered into the polynomial F are indicated by $v_1$ through $v_k$. Then, the polynomial reconstruction apparatus 201 generates the (k−1)-degree polynomial F' that outputs the outputs $v_1$ through $v_k$. The distributed secret information reconstruction apparatus 202 receives k pairs of the second random numbers output by the distributed secret information distribution apparatus 102 and outputs when the second random numbers are entered into a (k−1)-degree polynomial G generated by the distributed secret information distribution apparatus 102 and generates a (k−1)-degree polynomial G'. Assume that the received second random numbers are indicated by $x_1$ through $x_k$ and the outputs when the second random numbers $x_1$ through $x_k$ are entered into the polynomial G are indicated by $w_1$ through $w_k$. Then, the distributed secret information reconstruction apparatus 202 generates the (k−1)-degree polynomial G' that outputs the outputs $w_1$ through $w_k$.

The storage apparatus 300-i (i=1, . . . , n) includes a first random number storage apparatus 301-i that stores the source of the first random number data set RA, a distributed secret information storage apparatus 302-i that stores the source of the distributed secret information data set BS, a second random number storage apparatus 303-i that stores the source of the second random number data set RB, and a distributed distributed secret information storage apparatus 304-i that stores the source of the distributed distributed secret information data set BBS. Incidentally, FIGS. 2 and 3 show the n storage apparatuses 300-1 to 300-n.

In the exemplary embodiment of the present invention, a reconstruction result verification apparatus is the apparatus used for verifying correctness of a reconstruction process in which a participant having certain distributed information did not participate. The reconstruction result verification apparatus, for example, can be used for verifying presence or absence of cheating in which a reconstruction process is performed by k cheaters using their distributed information and a reconstruction result is falsified.

Figure 4:
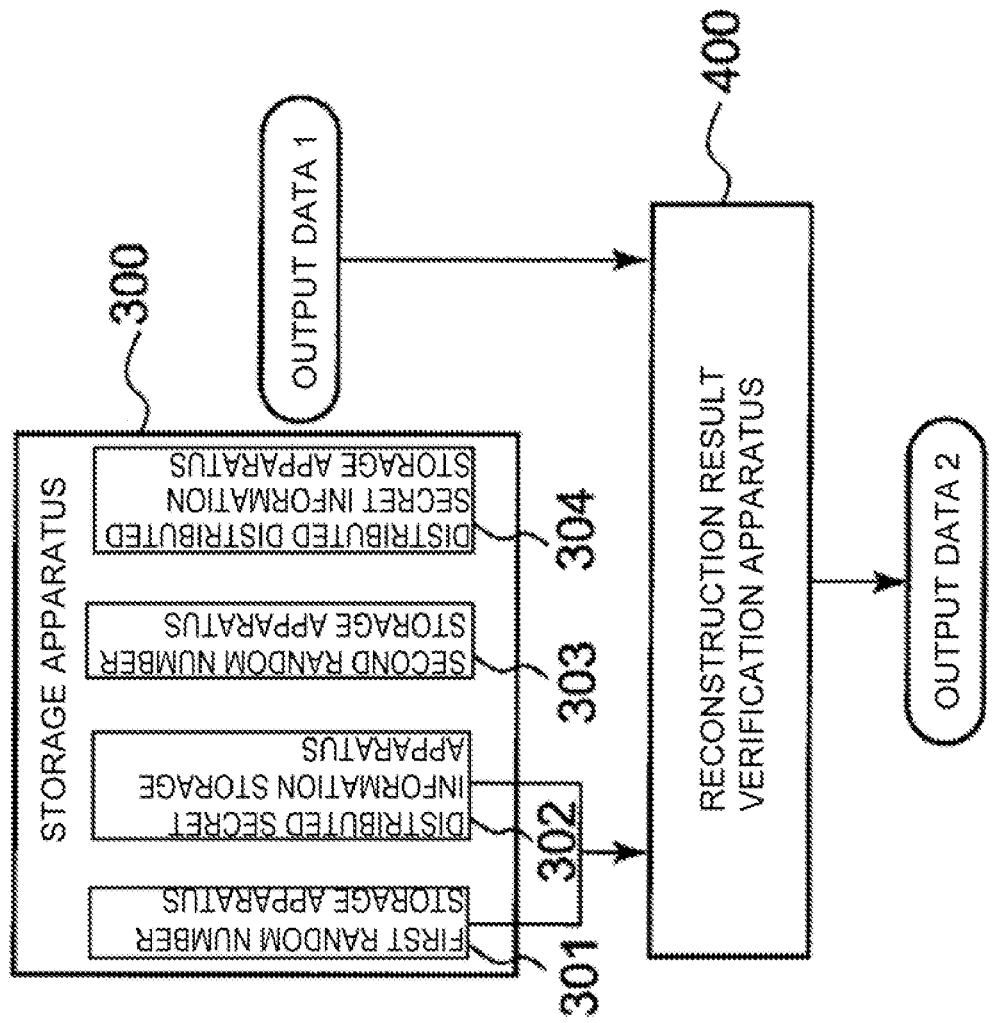
FIG. 4 is a block diagram showing configuration examples of a reconstruction result verification apparatus and one of the storage apparatuses.

FIG. 4 is a block diagram showing a configuration example of a reconstruction result verification apparatus 400 and one of the storage apparatuses 300 (300-1 to 300-n). The reconstruction result verification apparatus 400 is used, for example, for verifying correctness of a reconstruction process in which a participant having certain distributed information did not participate. The reconstruction result verification apparatus 400 receives an output of the reconstruction apparatus 200 (output data 1 from the cheating detection apparatus 203 in FIG. 3) in the reconstruction process that has been already performed and distributed secret information that has not been used in that reconstruction process, thereby performing verification.

In the following description, a description will be given, using a case where the one of the storage apparatuses 300 stores the distributed information that has not been used in the reconstruction process, as an example. The one of the storage apparatus 300 includes a corresponding one of the first random number storage apparatuses 301 (301-1 to 301-n) that stores a source r of the first random number data set RA, a corresponding one of the distributed secret information storage apparatuses 302 (302-1 to 302n) that stores a source $V_r$ of the distributed secret information data set BS, a corresponding one of the second random number storage apparatuses 303 (303-1 to 301-n) that stores the source of the second random number data set RB, and a corresponding one of the distributed distributed secret information storage apparatuses 304 (304-1 to 304-n) that stores the source of the distributed distributed secret information data set BBS.

The reconstruction result verification apparatus 400 reads from the storage apparatus 300 the source r of the first random number data set RA and the source $V_r$ of the distributed secret information data set BS. The reconstruction result verification apparatus 400 receives the source f of the polynomial data set V and the source s of the secret information data set output by the reconstruction apparatus 200.

The source f of the polynomial data set V is herein an output of the reconstruction process in which the participant having the certain distributed information did not participate, for example. Further, the source r of the first random number data set RA and the source $V_r$ of the distributed secret information data set BS read from the storage apparatus 300 are the distributed information the participant has, and are the information that are not tampered. Accordingly, when the source f of the polynomial data set V received from the reconstruction apparatus 200 is correct, $f(r)=V_r$ is satisfied.

When $(r)=V_r$ is satisfied, the reconstruction result verification apparatus 400 outputs the source s of the secret information data set, and outputs the symbol indicating detection of cheating when $f(r)=V_r$ is not satisfied.

The distributed information generation apparatus 100, reconstruction apparatus 200, and reconstruction result verification apparatus 400 shown in FIGS. 2 to 4 may be implemented by a semiconductor integrated circuit such as an LSI (large scale integration) or a DSP (digital signal processor) constituted from a logic circuit or the like, for example.

Figure 5:
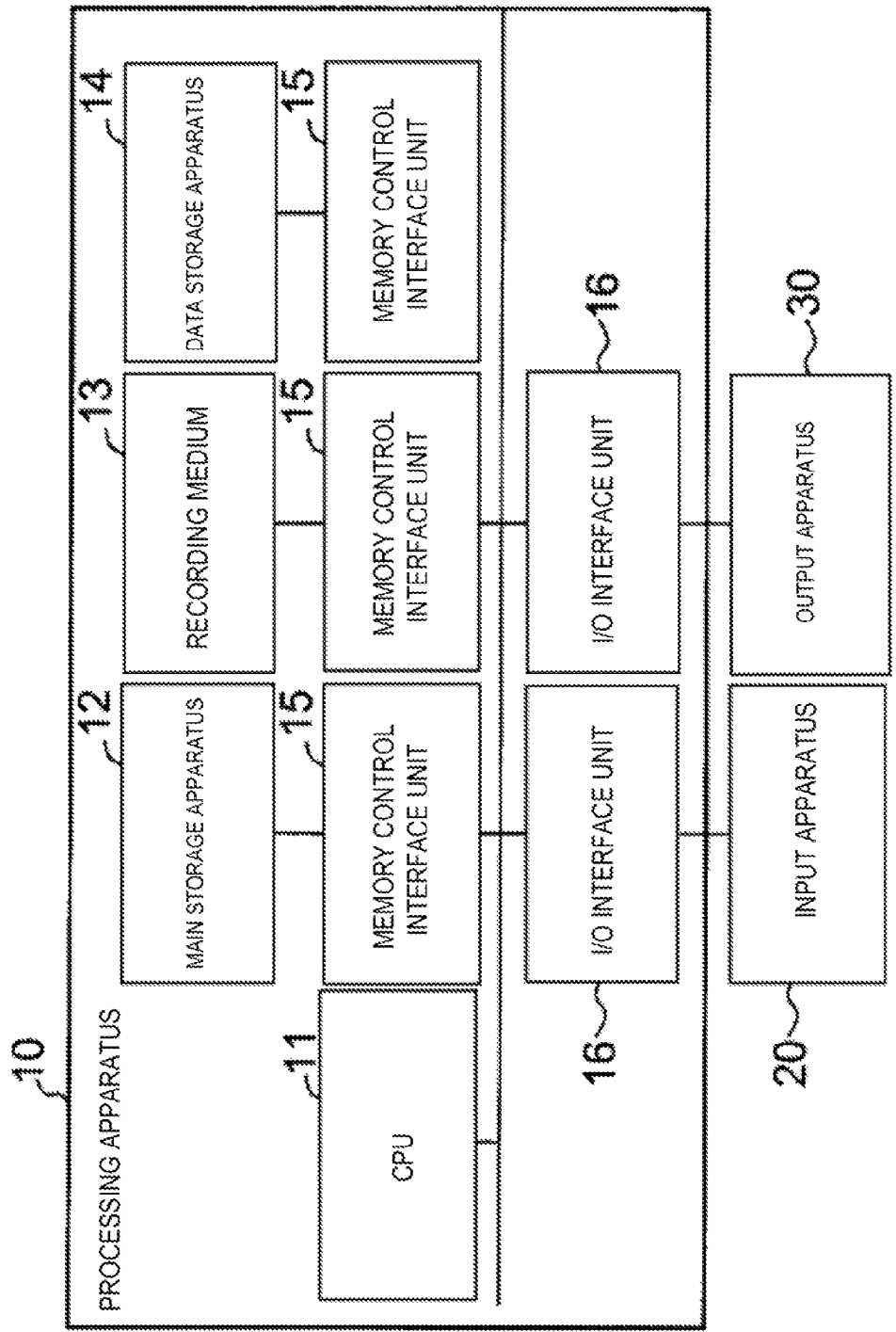
FIG. 5 is a block diagram showing a configuration example of a computer.

The distributed information generation apparatus 100, reconstruction apparatus 200, and reconstruction result verification apparatus 400 may be implemented by a computer (such as a personal computer). FIG. 5 is a block diagram showing a configuration example of the computer. The computer shown in FIG. 5 includes a process apparatus 10 that executes a predetermined process according to a program, an input apparatus 20 for supplying a command, information, or the like to the process apparatus, and an output apparatus 30 for monitoring a process result of the process apparatus 10.

The process apparatus 10 shown in FIG. 5 includes a CPU 11, a main storage apparatus 12, a recording medium 13, a data storage apparatus 14, memory control interface units 15, and I/O interface units 16, which are respectively connected through a bus 18.

The main storage apparatus 12 temporarily stores information necessary for a process of the CPU 11. The recording medium 13 records the program for causing the CPU 11 to execute processes as the distributed information generation apparatus 100, reconstruction apparatus 200, and reconstruction result verification apparatus 400, which will be described later. The data storage apparatus 14 stores secret information, threshold, number of distributed information, fixed value, and the like. The memory control interface unit 15 controls data transfer among the main storage apparatus 12, recording medium 13, and data storage apparatus 14. The I/O interface units 16 are interface apparatuses between the input apparatus 20 and the output apparatus 30.

The data storage apparatus 14 does not need to be located inside the process apparatus 10 and may be provided, being independent of the process apparatus 10. The data storage apparatus 14 may be the storage apparatus 300 including the first random number storage apparatus 301, distributed secret information storage apparatus 302, second random number storage apparatus 303, and distributed distributed secret information storage apparatus 304.

The process apparatus 10 implements a function as the distributed information generation apparatus 100 or the reconstruction apparatus 200 which will be described later, according to the program recorded on the recording medium 13. The recording medium 13 may be a magnetic disk, a semiconductor memory, an optical disk, or other recording medium.

Figure 6:
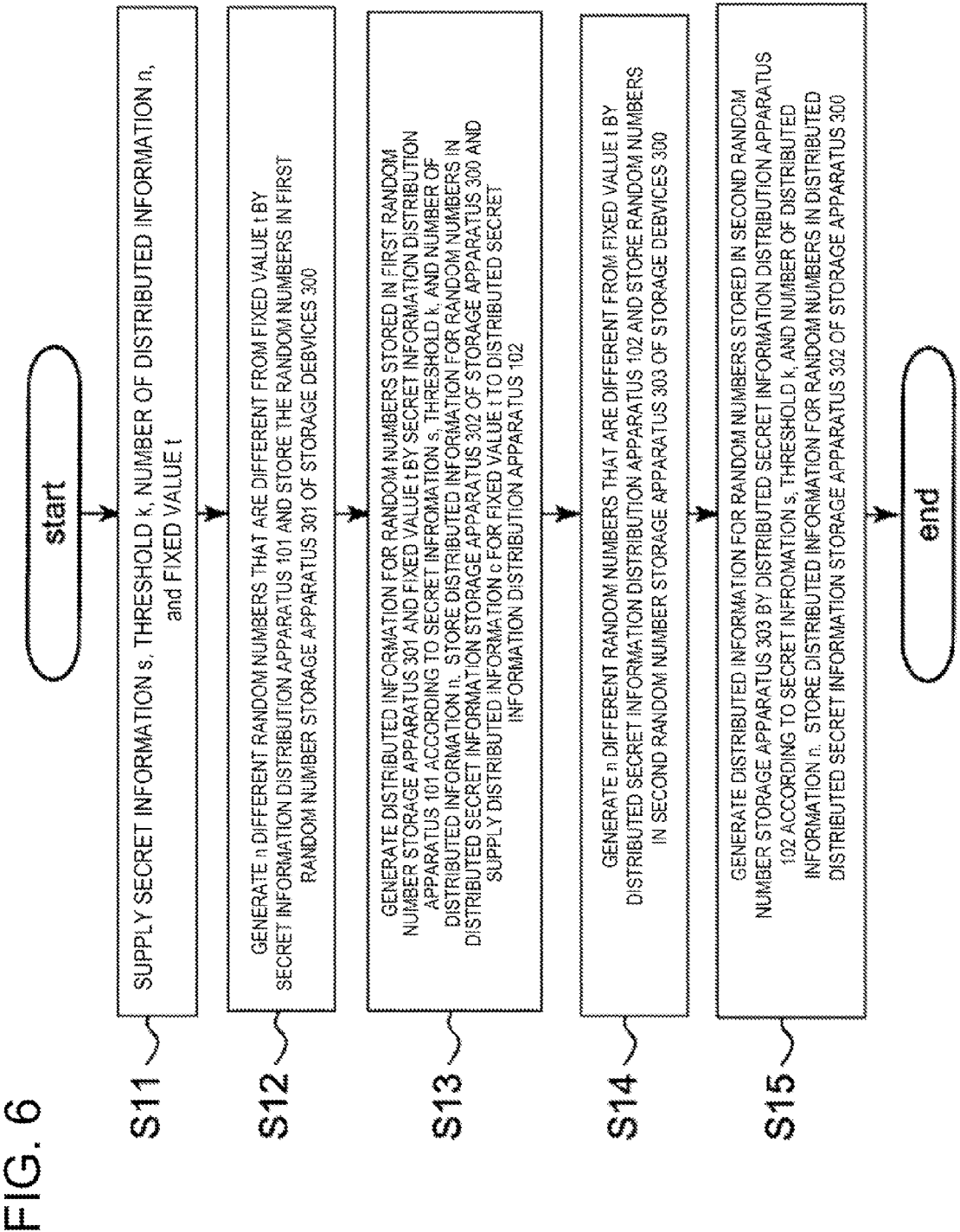
FIG. 6 is a flowchart showing an operation of the distributed information generation apparatus in the exemplary embodiment of the present invention.
Figure 7:
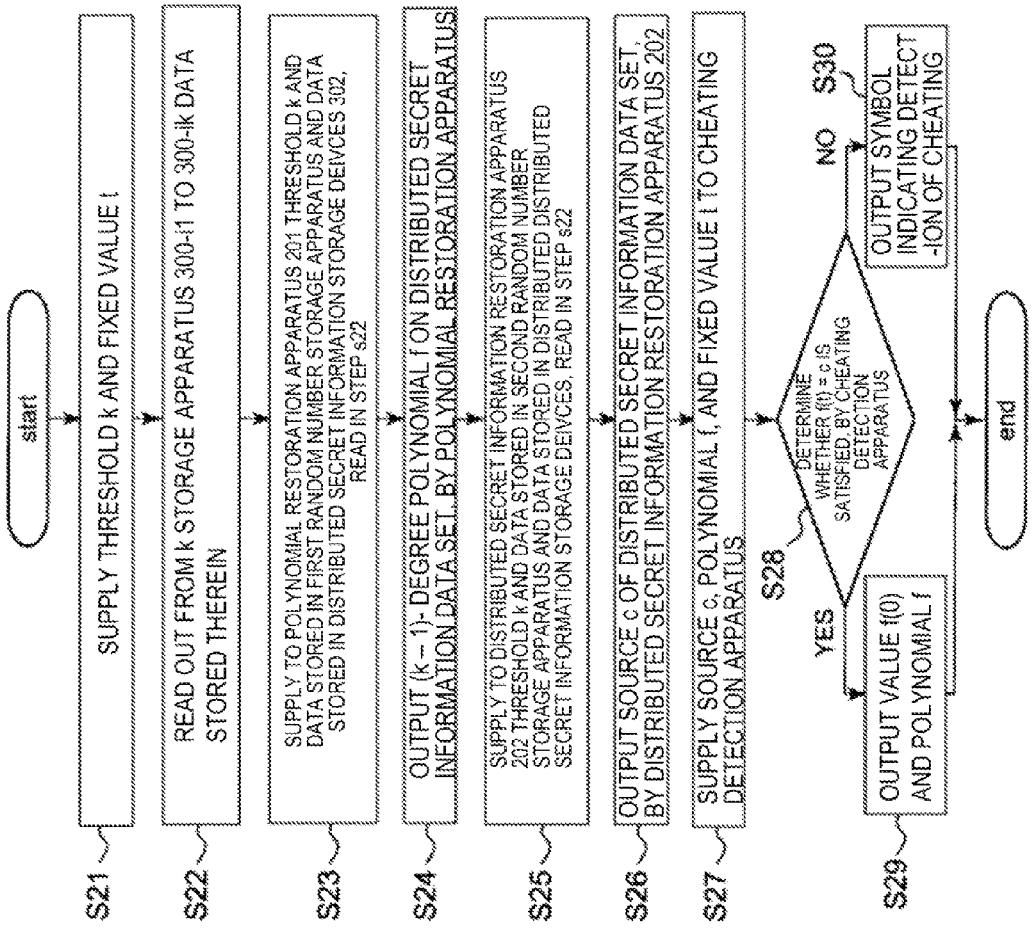
FIG. 7 is a flowchart showing an operation of the reconstruction apparatus in the exemplary embodiment of the present invention.

Next, an operation of the exemplary embodiment of the present invention will be described according to flowcharts shown in FIGS. 6, 7, and 8.

First, an operation of the distributed information generation apparatus 100 will be described. FIG. 6 is a flowchart showing the operation of the distributed information generation apparatus 100 in this exemplary embodiment.

Initially, the distributed information generation apparatus 100 receives the secret information s that is the source of the secret information data set S, threshold k, fixed value t, and number of distributed information n (in step S11).

Next, the distributed information generation apparatus 100 supplies the threshold k, number of distributed information 11, secret information s, and fixed value t to the secret information distribution apparatus 101, and stores the source of the first random number data set RA of the first random numbers that are different from one another in each of the first random number storage apparatuses 301-1 to 301-$n$ (in step S12).

Next, the secret information distribution apparatus 101 stores distributed information on the secret information s (distributed secret information) for data (first random numbers) stored in the first random number storage apparatuses 301-1 to 301-$n$, using the threshold k as a threshold, and generates distributed information on the secret information s for the fixed value t. The secret information distribution apparatus 101 stores in the distributed secret information storage apparatuses 302-1 to 302-$n$ of the storage apparatuses 300-1 to 300-$n$ the distributed information on the secret information s for the data stored in the first random number storage apparatuses 301-1 to 301-$n$. Further, the secret information distribution apparatus 101 outputs the distributed information c on the secret information s for the fixed value t to the distributed secret information distribution apparatus 102 (in step S13).

Next, the distributed information generation apparatus 100 supplies the threshold k, number of distributed information n, and distributed information c to the distributed secret information distribution apparatus 102, and stores the sources of the second random number data set RB of the second random numbers that are different from one another in the second random number storage apparatuses 303-1 to 303-$n$ of the storage apparatuses 300-1 to 300-$n$ (in step S14).

Next, the distributed secret information distribution apparatus 102 generates distributed information on the distributed information c for the data (second random numbers) stored in the second random number storage apparatuses 303-1 to 303-$n$, using the threshold k as a threshold. The distributed secret information distribution apparatus 102 stores in the distributed distributed secret information storage apparatuses 304-1 to 304-$n$ of the storage apparatuses 300-1 to 300-$n$ the distributed information on the distributed information c for the data stored in the second random number storage apparatuses 303-1 to 303-$n$ (in step S15), thereby completing the process.

Next, an operation of the reconstruction apparatus 200 will be described. FIG. 7 is a flowchart showing the operation of the reconstruction apparatus 200 in this exemplary embodiment.

The threshold k and the fixed value t are supplied to the reconstruction apparatus 200 (in step S21).

The reconstruction apparatus 200 reads out the data stored in the k storage apparatuses 300-$i_1$ to 300-$i_k$ (in step S22). The storage apparatuses 300-$i_1$ to 300-$i_k$ are the k apparatuses of the storage apparatus 300-$i$ (in which i=1, . . . , n), for example.

Next, the reconstruction apparatus 200 supplies to the polynomial reconstruction apparatus 201 the data stored in the first random number storage apparatuses 301-$i_1$ to 301-$i_k$ of the storage apparatuses 300-$i_1$ to 300-$i_k$ from which the data has been read, and the data stored in the distributed secret information storage apparatuses 302-$i_1$ to 302-$i_k$ of the storage apparatuses 300-$i_1$ to 300-$i_k$ from which the data has been read, and the threshold k (in step S23).

Next, using a reconstruction method corresponding to the distribution encoding method of the secret information distribution apparatus 101, the polynomial reconstruction apparatus 201 reconstructs the source f of the polynomial data set V, for output (in step S24).

Next, the reconstruction apparatus 200 supplies the data stored in the second random number storage apparatuses 303-$i_1$ to 303-$i_k$ of the storage apparatuses 300-$i_1$ to 300-$i_k$ from which the data has been read, the data stored in the distributed secret information storage apparatuses 304-$i_1$ to 304-$i_k$ of the storage apparatuses 300-$i_1$ to 300-$i_k$ from which the data has been read, and the threshold k to the distributed secret information reconstruction apparatus 202 (in step S25).

Next, using a reconstruction method corresponding to the distribution encoding method of the distributed secret information distribution apparatus 102, the distributed secret information reconstruction apparatus 202 performs a calculation for reconstruction, thereby reconstructing the source c of the distributed secret information data set BS, for output (in step S26).

Next, the reconstruction apparatus 200 supplies the source f of the polynomial data set V, the source c of the distributed secret information data set, and the fixed value t to the cheating detection apparatus 203 (in step S27), and then checks whether or not f(t)=c is satisfied (in step S28). When f(t)=c holds (YES branch in step S28), the cheating detection apparatus 203 outputs the value f(0) and the polynomial f (in step S29). When f(t)=c does not hold (NO branch in step S28), the cheating detection apparatus 203 outputs the symbol indicating detection of cheating (in step S30), thereby completing the process.

Next, an operation of the reconstruction result verification apparatus 400 will be described. FIG. 8 is a flowchart showing the operation of the reconstruction result verification apparatus 400 in this exemplary embodiment.

Initially, the source f of the polynomial data set V is supplied to the reconstruction result verification apparatus 400 (in step S31).

Next, the reconstruction result verification apparatus 400 reads out the data stored in one of the storage apparatuses 300 (in step S32). The reconstruction result verification apparatus 400 reads out the source r of the first random number data set RA stored in the first random number storage apparatus 301 and the source $V_r$ of the distributed secret information data set BS stored in the distributed secret information storage apparatus 302, for example.

Next, the reconstruction result verification apparatus 400 checks whether or not the data r stored in the corresponding one of the first random number storage apparatuses 301 of the storage apparatus 300 from which the data has been read and the data $V_r$ stored in the corresponding one of the distributed secret information storage apparatuses 302 of the storage apparatus 300 from which the data has been read satisfy f(r)=$V_r$ (in step S33). When f(r)=$V_r$ holds (YES branch in step S33), the reconstruction result verification apparatus 400 outputs the value f(0) (in step S34). When f(r)=$V_r$ does not hold (NO branch in step S33), the reconstruction result verification apparatus 400 outputs the symbol indicating detection of cheating (in step S35), thereby completing the process.

Now, the reason why the exemplary embodiment of the present invention is more efficient than an existing method will be described. It is assumed that the secret information is one of values 0, . . . , and p−1. In a method described in Non-patent Document 3, a (k−1)-degree polynomial f on mod q (q>p) having the secret information as a constant term thereof is first generated. Second, random values (that are set to $r_1$, . . . , and $r_n$) are respectively assigned for each distributed information. Third, ($r_1$, f($r_1$)), . . . , and ($r_n$, f($r_n$)) are set to distributed information. In the method described in Non-patent Document 3, the polynomial f is reconstructed using k or more items of the distributed information. Then, when the constant term of the polynomial f is one of the values 0, . . . , and p−1, it is determined that there was no cheating.

Consider a situation where cheaters who know ($r_1$, f($r_1$)), f($r_{n-1}$)) are to cheat a person who has ($r_n$, f($r_n$)) (which the cheaters do not know) in the method described in Non-patent Document 3.

Herein, consider a case where the cheaters alter ($r_1$, f($r_1$)), . . . , and ($r_{k-1}$, f($r_{k-1}$)) into ($r_1'$, $f_1'$), . . . , and ($r_{k-1}'$, $f_{k-1}'$), for supply to the reconstruction apparatus. When the constant term of the polynomial reconstructed from ($r_1'$, $f_1'$), . . . , and ($r_{k-1}'$, $f_{k-1}'$), ($r_n$, f($r_n$)) is one of the values (0, . . . , p−1) other than the distributed secret information, cheating has succeeded.

Assume that one of the values 0, . . . , and p−1, which is different from certain secret information is indicated by s', and a polynomial reconstructed from ($r_1'$, $f_1'$), . . . , and ($r_{k-1}'$, $f_{k-1}'$), (0, s') is indicated by f'. Since the polynomial f' is a (k−1)-degree polynomial different from the polynomial f, the polynomial f intersects the polynomial f' at not more than (k−1) points. When ($r_n$, f($r_n$)) is a point on this polynomial f', and when the person who has ($r_n$, f($r_n$)) reconstructs the secret information using ($r_1'$ $f_1'$), . . . , ($r_{k-1}$, $f_{k-1}'$), ($r_n$, f($r_n$)), the value s' is reconstructed.

There are (p−1) values other than the original secret information. Since the polynomial f' is determined for each of the values, (p−1) polynomials f' are determined. Assume that the cheaters generate ($r_1'$, $f_1'$), . . . , and ($r_{k-1}'$, $f_{k-1}'$) so that the polynomial f intersects all the polynomials f' at different points. Then, when $r_n$, is one of (p−1)(k−1) values, cheating will succeed.

Assume that $r_n$ is selected from among the values 0, . . . , and R. When $r_n$ is uniformly selected at random, the probability of success of the cheating is indicated by (p−1)(k−1)/R. That is, a large value R must be selected so that the value of this probability is sufficiently small. When the success rate of the cheating is to be on the order of $\epsilon$, it is necessary to set R to the order of ((p−1)(k−1))/$\epsilon$.

In order to set R equal to or more than ((p−1)(k−1))/$\epsilon$, it is necessary to set q to equal to or more than ((p−1)(k−1))/$\epsilon$, wherein $r_n$ and f($r_n$) are distributed information and each of the sizes of the information $r_n$ and f($r_n$) is q. Accordingly, the size of the distributed information is ((p−1)(k−1))/$\epsilon)^2$.

On contrast therewith, the exemplary embodiment of the present invention is a method in which one of the random numbers is set to the constant. First, the (k−1)-degree polynomial f on the finite field GF(p) having the secret information as the constant term thereof is generated. Second, the random values (that are set to $r_1$, . . . , and $r_n$ and set to be different from the fixed value t) are respectively assigned for each distributed information. Third, the (k−1)-degree polynomial g on the finite field GF(p) having the constant term of the value f(t) is generated. Fourth, ($r_1$, f($r_1$), g(1)), . . . , and ($r_n$, f($r_n$), g(n)) are set to the distributed information. In this method, the polynomial f and the polynomial g are reconstructed using k or more pieces of the distributed information. Then, it is checked whether an expression of f(t)=g(0) is satisfied. Then, when the expression is satisfied, it is determined that there was no cheating.

Consider a situation where cheaters who know ($r_1$, f($r_1$), g(1)), . . . , ($r_{n-1}$, f($r_{n-1}$), g(n−1)) are to cheat a person who has ($r_n$, f($r_n$), g(n)) in this method. The cheaters do not know $r_n$ and f($r_n$), but know g(n) because the polynomial g is obtained from g(1), . . . , and g(k) and the cheaters know an input to the polynomial g.

Consider a case where the cheaters alter $(r_{i1}, f(r_{i1}), \ldots, g(i_1)), \ldots, (r_{i(k-1)}, f(r_{i(k-1)}), g(i_{k-1}))$ into $(r_{\_1}', f_{\_1}', g_{\_1}'), \ldots, (r_{\_(k-1)}', f_{\_(k-1)}', g_{\_(k-1)}')$ for input to the reconstruction apparatus.

The polynomial f' is reconstructed from $(r_{\_1}', f_{\_1'}), \ldots, (r_{\_(k-1)}', f_{\_(k-1)}', (r_n, f(r_n))$, and the polynomial g' is reconstructed from $(i_1, g(i_1)'), \ldots, (i_{k1}, g(i_{k1})'), (n, g(n))$. When f'(t)=g'(0) holds, cheating has succeeded.

This checking is nothing more or less than checking whether or not $(r_{\_1}', f_{\_1}', \ldots, (r_{\_(k-1)}', f_{\_(k-1)}'), (t, g'(0)), (r_n, f(r_n))$ are all on the same polynomial.

The polynomial f' can be regarded as the polynomial of one type reconstructed from $(r_{\_1}', f_{\_1}'), \ldots, (r_{\_(k-1)}', f_{\_(k-1)}'), (t, g'(0))$. Further, f'(0) is a value different from the secret information f(0). Thus, f(0) and f(0)' are different. Thus, the polynomials f and f' are constantly different. For this reason, the polynomial f intersects the polynomial f' at not more than (k-1) points. Thus, when $r_n$ is set to be selected from 0, ..., and R, (k-1)/R is the probability of success of cheating.

Assume that $\epsilon=(k-1)/R$. Then, since $(r_i, f(r_i), g_{(i)})$ is distributed information and the size of the random value $r_i$ is R, and the size of each of $f(r_i)$ and g(i) is p, the size of the distributed information becomes approximately $p^2/\epsilon$. Accordingly, in the exemplary embodiment of the present invention, the size of the distributed information can be reduced just by a factor of $\epsilon$ from that of a conventional art.

In the existing method capable of detecting cheating even if cheaters hold distributed information of pieces of the number equal to or more than the threshold, the method that uses one polynomial has been known. In this method, functions of distributing a secret and detecting cheating are implemented by using the one polynomial. Thus, it is necessary to provide an extremely large finite field. In the exemplary embodiment of the present invention, two polynomials about secret information are provided, and a method of checking the two polynomials to each other is adopted. The size of the finite field is reduced for each polynomial, thereby constituting the method using the size of the distributed information smaller than that in the existing method. By using the method in the exemplary embodiment of the present invention, a result of a reconstruction process can also be verified even if a participant did not participate in the reconstruction process.

In this exemplary embodiment, a (k,n) threshold scheme was illustrated and described. When a linear secret distribution method is used, the method in this exemplary embodiment is not limited to the (k,n) threshold scheme.

FIRST EXEMPLARY EMBODIMENT

A first exemplary embodiment of the present invention will be described below with reference to FIGS. 2, 3, and 4.

A description will be given below about a case where a secret information distribution apparatus 101 generates a (k-1)-degree polynomial in which a constant term is secret information s. In the first embodiment, a finite field GF(p) is used as a secret information data set in the exemplary embodiment.

The finite field GF(p) is a finite field for a prime number p or a power of the prime number p, and an addition on the finite field is indicated by +, a subtraction on the finite field is indicated by −, a division on the finite field is indicated by /, and exponentiation is indicated by ^. It is assumed that a threshold k, a number of distributed information n, and the prime number or the power of the prime number p satisfies $k \leq n \leq p-1$. Further, as a fixed value t, a value that satisfies $0 \leq t \leq p-1$ is used.

A description will be given, using as an example a case where the secret information distribution apparatus 101 and a distributed secret information distribution apparatus 102 perform distribution encoding of the secret information, using a (k,n) threshold scheme in Non-patent Document 1. Further, a description will be given, using as an example a case where a polynomial reconstruction apparatus 201 and a distributed secret information reconstruction apparatus 202 reconstruct the secret information using the (k,n) threshold scheme described in Non-patent Document 1.

First, a first exemplary embodiment of a distributed information generation apparatus 100 will be described.

The threshold k, number of distributed information n, and secret information s are supplied to the distributed information generation apparatus 100.

Initially, the distributed information generation apparatus 100 supplies the threshold k, number of distributed information n, secret information s, and fixed value t to the secret information distribution apparatus 101.

The secret information distribution apparatus 101 selects $r_1, r_2, \ldots,$ and $r_n$ that are different from the fixed value t and different from one another, from 1, 2, ..., $R_1$ ($R_1 \leq p-1$) at random, and stores the random number $r_i$ in a first random dumber storage apparatus 301-$i$ of a storage apparatus 300-$i$ (i=1, n). For example, the secret information distribution apparatus 101 stores the random number $r_1$ in the first random number storage apparatus 301-1 of the storage apparatus 300-1, stores the random number $r_2$ in the first random number storage apparatus 301-2 of the storage apparatus 300-2, and stores the random number $r_n$ in the first random number storage apparatus 301-$n$ of the storage apparatus 300-$n$. Then, the secret information distribution apparatus 101 generates a (k-1)-degree polynomial on the finite field GF(p), in which a constant term is the secret information s, at random. The (k-1)-degree polynomial is indicated by $f_{1(x)}$. The polynomial $f_{1(x)}$ corresponds to a polynomial f in the exemplary embodiment of the present invention.

The secret information distribution apparatus 101 stores the polynomial $f_{1(ri)}$ in the distributed secret information storage apparatus 302-$i$ of the storage apparatus 300-$i$ (i=1, ..., n). For example, the secret information distribution apparatus 101 stores the polynomial $f_{1(r1)}$ in the distributed secret information storage apparatus 302-1 of the storage apparatus 300-1. The secret information distribution apparatus 101 stores the polynomial $f_{1(r2)}$ in the distributed secret information storage apparatus 302-2 of the storage apparatus 300-2. The secret information distribution apparatus 101 stores the polynomial $f_{1(rn)}$ in the distributed information storage apparatus 302-$n$ of the storage apparatus 300-$n$. The secret information distribution apparatus 101 outputs an output $c=f_{1(t)}$.

Next, the distributed information generation apparatus 100 supplies the threshold k, number of distributed information n, and the output c of the secret information distribution apparatus 101 to the distributed secret information distribution apparatus 102.

The distributed secret information distribution apparatus 102 selects $x_1, x_2, \ldots, x_n$ that are different from one another from 1, 2, ..., $R_2$ ($R_2 \leq p-1$) at random, and stores the random number $x_i$ in a second random number storage apparatus 303-$i$ of the storage apparatus 300-$i$ (i=1, ..., n). For example, the distributed secret information distribution apparatus 102 stores the random number $x_1$ in the second random number storage apparatus 303-1 of the storage apparatus 300-1, stores the random number $x_2$ in the second random number storage apparatus 303-2 of the storage apparatus 300-2, and stores the random number $x_n$ in the second random number storage apparatus 303-$n$ of the storage apparatus 300-$n$.

The secret information distribution apparatus 102 stores the polynomial $f_{2(xi)}$ in a distributed distributed secret information storage apparatus 304-$i$ of the storage apparatus 300-$i$ ($i=1, \ldots, n$). For example, the distributed secret information distribution apparatus 102 stores the polynomial $f_{2(x1)}$ in the distributed distributed secret information storage apparatus 304-1 of the storage apparatus 300-1. The distributed secret information distribution apparatus 102 stores the polynomial $f_{2(x2)}$ in the distributed distributed secret information storage apparatus 304-2 of the storage apparatus 300-2. The distributed secret information distribution apparatus 102 stores the polynomial $f_{2(xn)}$ in the distributed distributed information storage apparatus 304-$n$ of the storage apparatus 300-$n$.

Next, the exemplary embodiment of a reconstruction apparatus 200 will be described.

The threshold k and the fixed value t are supplied to the reconstruction apparatus 200. The reconstruction apparatus 200 supplies the threshold k to a polynomial reconstruction apparatus 201.

The polynomial reconstruction apparatus 201 reads out the values stored in the respective distributed secret information storage apparatuses 302-$j_1$, 302-$j_2$, ..., and 302-$j_k$ from k storage apparatuses 300-$j_1$, 300-$j_2$, ..., 300-$j_k$ of the storage apparatuses 300-1 to 300-$n$. Herein, the values stored in the distributed secret information storage apparatuses 302-$j_1$, 302-$j_2$, ..., and 302-$j_k$ are indicated by $bs1_{j\_1}, bs1_{j\_2}, \ldots$, and $bs1_{j\_k}$, respectively.

Next, the polynomial reconstruction apparatus 201 reads out the values stored in the respective first random number storage apparatuses 301-$j_1$, 301-$j_2$, ..., and 301-$j_k$ from the storage apparatuses 300-$j_1$, 300-$j_2$, ..., and 300-$j_k$. Herein, the values stored in the first random storage apparatuses 301-$j_1$, 301-$j_2$, ..., and 301-$j_k$ are indicated by $r_{j\_1}, r_{j\_2}, \ldots$, and $r_{j\_k}$, respectively.

Next, the polynomial reconstruction apparatus 201 outputs a (k−1) degree polynomial $g_{s\_1(x)}$ on the finite field GF(p) that passes through $(r_{j\_1}, bs1_{j\_1}), (r_{j\_2}, bs1_{j\_2}), \ldots$, and $(r_{j\_k}, bs1_{j\_k})$. Specifically, the polynomial $g_{s\_1(x)}$ is computed by a method of solving simultaneous equations or the like. The polynomial $g_{s\_1(x)}$ corresponds to the source f of a polynomial data set V or a polynomial f' in the exemplary embodiment.

Next, the reconstruction apparatus 200 supplies the threshold k to the distributed secret information reconstruction apparatus 202.

The distributed secret information reconstruction apparatus 202 reads out the values stored in the respective distributed distributed secret information storage apparatuses 304-$j_1$, 304-$j_2$, ..., and 304-$j_k$ from the storage apparatuses 300-$j_1$, 300-$j_2$, 300-$j_k$. Herein, the values stored in the distributed distributed secret information storage apparatuses 304-$j_1$, 304-$j_2$, ..., and 304-$j_k$ are indicated by $bs2_{j1}, bs2_{j2}, \ldots$, and $bs2_{jk}$, respectively.

Next, the distributed secret information reconstruction apparatus 202 reads out the values stored in the respective second random number storage apparatuses 303-$j_1$, 303-$j_2$, and 303-$j_k$ from the storage apparatuses 300-$j_1$, 300-$j_2$, ..., and 300-$j_k$. Herein, the values stored in the second random storage apparatuses 303-$j_1$, 303-$j_2$, ..., and 303-$j_k$ are indicated by $x_{j\_1}, x_{j\_2}, \ldots$, and $x_{j\_k}$, respectively.

Next, the distributed secret information reconstruction apparatus 202 outputs a value $g_{s\_2(0)}$ of a (k−1)-degree polynomial $g_{s\_2(x)}$ on the finite field GF(p) that passes through $(x_{j\_1}, bs2_{j\_1}), (x_{j\_2}, bs2_{j\_2}), \ldots, (x_{j\_k}, bs2_{j\_k})$. Specifically, the value $g_{s\_2(0)}$ is computed by a method of solving simultaneous equations, using Lagrange interpolation, or the like.

The polynomial $g_{s\_2(x)}$ corresponds to the polynomial g or a polynomial g' in the exemplary embodiment.

Next, the reconstruction apparatus 200 supplies the polynomials $g_{s\_1(x)}$ and the value $g_{s\_2(0)}$ to a cheating detection apparatus 203. The cheating detection apparatus 203 checks whether or not $g_{s\_1(t)} = g_{s\_2(0)}$ is satisfied. When $g_{s\_1(t)} = g_{s\_2(0)}$ is satisfied, the cheating detection apparatus 203 outputs the a value $g_{s\_1(0)}$ and the polynomial $g_{s\_1(x)}$. When $g_{s\_1(t)} = g_{s\_2(0)}$ is not satisfied, a symbol $\bot$ is output as a symbol indicating detection of cheating.

Next, the exemplary embodiment of a reconstruction result verification apparatus 400 will be described.

A (k−1)-degree polynomial g(x) on the finite field GF(p) is supplied to the reconstruction result verification apparatus 400. Herein, the polynomial g(x) is an output in a certain reconstruction process, for example.

The reconstruction result verification apparatus 400 reads out a value r stored in the first random number storage apparatus 301-$i$ and a value $V_r$ stored in the distributed secret information storage apparatus 302-$i$ from the storage apparatus 300-$i$. Next, it is checked whether or not $g(r) = V_r$ is satisfied. When $g(r) = V_r$ is satisfied, the reconstruction result verification apparatus 400 outputs a value g(0). When $g(r) = V_r$ is not satisfied, the reconstruction result verification apparatus 400 outputs the symbol indicating detection of cheating. The storage apparatus 300-$i$ is one of the storage apparatuses 300-1 to 300-$n$ in which one of the distributed information that has not been used in the reconstruction process is stored.

When the number of the data stored in the storage apparatuses 300 and known by cheaters is indicated by a, and the size of the secret information is indicated by p in the first embodiment, the size of the distributed information is indicated by $P^2 \times R_1 \times R_2$. Then, the detection ratio of cheating is indicated by $1 - (k-1)/(R_{1-a})$.

When the size of the secret information is indicated by s and the detection ratio of cheating is indicated by (1−ϵ), the size of the distributed information can be indicated by $s^2 \times ((k-1)/\epsilon + t) \times R_2$.

The size of distributed information in a method described in Non-patent Document 3 is indicated by $((s-1)(k-1)/\epsilon + k)^2$. Comparison between the first exemplary embodiment and Non-patent Document 3 will be made, assuming that k=2, t=2, $p = 2^{80}$, $\epsilon = 1/2^{80}$, and $R_2 = 2^{10}$.

The size of the distributed information in the first exemplary embodiment is approximately $2^{250}$, while the size of distributed information in the method described in Non-patent Document 1 is approximately $2^{320}$. It can be seen that the size of the distributed information in the first exemplary embodiment is smaller than that in the method described in Non-patent Document 1.

Depending on the operation form, a case where a participant does not need verification of a result of a reconstruction process in which he has not participated. In this case, by removing the reconstruction result verification apparatus 400 and the polynomial f output by the reconstruction apparatus 200, a secret information distribution system for determining whether or not there is a falsified data share in a reconstruction process in which the participant has participated can be configured. The size of random numbers $R_2$ is not related to safety. Then, depending on the operation form, an ID number assigned to each storage apparatus can be used. In that case, the size of the distributed information corresponding to the random numbers $R_2$ can be reduced.

SECOND EXEMPLARY EMBODIMENT

A second exemplary embodiment of this exemplary embodiment will be described below, with reference to FIGS.

2, 3, and 4. A description will be given about a case where a secret information distribution apparatus 101 generates a (k−1)-degree polynomial in which secret information s is embedded in a value obtained by connecting coefficients of terms from a constant term to an (L−1)-degree term. In the second embodiment, as a data set of secret information in the exemplary embodiment, a finite field $GF(p^L)$ is employed.

The finite field $GF(p^L)$ is a finite field for a prime number $p^L$ or a power of the prime number $p^L$, and an addition on the finite field is indicated by +, a subtraction on the finite field is indicated by −, a division on the finite field is indicated by /, and exponentiation is indicated by ^. Elements s of the finite field $GF(p^L)$ are a set of L elements of a finite field $GF(p)$, and can be indicated by $(s_0, s_1, s_2, \ldots, s_{L-1})$. It is assumed that a threshold k, a number of distributed information n, and the prime number or power of the prime number p satisfies $k \leq n \leq p-1$. Further, as a fixed value t, a value that satisfies $0 \leq t \leq p-1$ is used.

A description will be given, using as an example a case where the secret information distribution apparatus 101 and a distributed secret information distribution apparatus 102 perform distribution encoding of the secret information, using a (k,n) threshold scheme described in Non-patent Documents 1 and 2. Further, a description will be given, using as an example a case where a polynomial reconstruction apparatus 201 and a distributed secret information reconstruction apparatus 202 reconstruct the secret information using the (k,n) threshold scheme described in Non-patent Documents 1 and 2.

First, the second exemplary embodiment of a distributed information generation apparatus 100 will be described.

The threshold k, number of distributed information n, and secret information s are supplied to the distributed information generation apparatus 100.

Initially, the distributed information generation apparatus 100 supplies the threshold k, number of distributed information n, secret information s, and fixed value t to the secret information distribution apparatus 101. Herein, the secret information distribution apparatus 101 may receive parameters L of the number which is less than or equal to k−1.

The secret information distribution apparatus 101 selects $r_1, r_2, \ldots,$ and $r_n$ that are different from the fixed value t and are different from one another, from $1, 2, \ldots, R_1$ $(R_1 \leq p-1)$ at random, and stores the random number $r_i$ in a first random dumber storage apparatus 301-$i$ of a storage apparatus 300-$i$ (i=1, . . . , n). For example, the secret information distribution apparatus 101 stores the random number $r_1$ in the first random number storage apparatus 301-1 of the storage apparatus 300-1, stores the random number $r_2$ in the first random number storage apparatus 301-2 of the storage apparatus 300-2, and stores the random number $r_n$ in the first random number storage apparatus 301-$n$ of the storage apparatus 300-$n$. Then, the secret information distribution apparatus 101 generates a (k−1)-degree polynomial $f_1$ in which $(s_0, \ldots, s_{L-1})$ as the secret information s are embedded in coefficients of the polynomial on a finite field $GF(p)$, at random.

$$f_{1(x)} = s_0 + s_1 \times x + \ldots + s_{L-1} \times x^{(L-1)} + a_L \times x^L + \ldots + a_{k-1} \times x^{(k-1)} \quad \text{Expression (1)}$$

The expression (1) is indicated by $f_{1(x)}$.

The secret information distribution apparatus 101 stores the polynomial $f_{1(ri)}$ in a distributed secret information storage apparatus 302-$i$ of the storage apparatus 300-$i$ (i=1, . . . , n). For example, the secret information distribution apparatus 101 stores the polynomial $f_{1(r1)}$ in the distributed secret information storage apparatus 302-1 of the storage apparatus 300-1. The secret information distribution apparatus 101 stores the polynomial $f_{1(r2)}$ in the distributed secret information storage apparatus 302-2 of the storage apparatus 300-2. The secret information distribution apparatus 101 stores the polynomial $f_{1(rn)}$ in the distributed information storage apparatus 302-$n$ of the storage apparatus 300-$n$. The secret information distribution apparatus 101 outputs an output $c = f_{1(t)}$.

Next, the distributed information generation apparatus 100 supplies the threshold k, number of distributed information n, and the output c of the secret information distribution apparatus 101 to the distributed secret information distribution apparatus 102.

The distributed secret information distribution apparatus 102 selects $x_1, x_2, \ldots, x_n$ that are different from one another from $1, 2, \ldots, R_2$ $(R_2 \leq p-1)$ at random, and stores a random number $x_i$ in a second random number storage apparatus 303-$i$ of the storage apparatus 300-$i$ (i=1, . . . , n). For example, the distributed secret information distribution apparatus 102 stores the random number $x_1$ in the second random number storage apparatus 303-1 of the storage apparatus 300-1, stores the random number $x_2$ in the second random number storage apparatus 303-2 of the storage apparatus 300-2, and stores the random number $x_n$ in the second random number storage apparatus 303-$n$ of the storage apparatus 300-$n$.

The second secret information distribution apparatus 102 generates a (k−1)-degree polynomial in which a constant term on the finite field $GF(p)$ is the output c at random. The (k−1)-degree polynomial is indicated by $f_{2(x)}$. Then, the second secret information distribution apparatus 102 stores the polynomial $f2_{(xi)}$ in a distributed distributed secret information storage apparatus 304-$i$ of the storage apparatus 300-$i$ (i=1, . . . , n). For example, the second secret information distribution apparatus 102 stores the polynomial $f_{2(x1)}$ in the distributed distributed secret information storage apparatus 304-1 of the storage apparatus 300-1. The second secret information distribution apparatus 102 stores the polynomial $f_{2(x2)}$ in the distributed distributed secret information storage apparatus 304-2 of the storage apparatus 300-2. The second secret information distribution apparatus 102 stores the polynomial $f_{2(xn)}$ in the distributed distributed information storage apparatus 304-$n$ of the storage apparatus 300-$n$.

Next, the exemplary embodiment of a reconstruction apparatus 200 will be described.

The threshold k and the fixed value t are supplied to the reconstruction apparatus 200. The reconstruction apparatus 200 supplies the threshold k to a polynomial reconstruction apparatus 201.

The polynomial reconstruction apparatus 201 reads out the values stored in the respective k distributed secret information storage apparatuses 302-$j_1$, 302-$j_2$, . . . , and 302-$j_k$ from the k distributed secret information storage apparatuses 300-$j_1$, 300-$j_2$, . . . , 300-$j_k$ of the storage apparatuses 300-1 to 300-$n$. Herein, the values stored in the distributed secret information storage apparatuses 302-$j_1$, 302-$j_2$, . . . , and 302-$j_k$ are indicated by $bs1_{j\_1}$, $bs1_{j\_2}$, and $bs1_{j\_k}$, respectively.

Next, the polynomial reconstruction apparatus 201 reads out the values stored in the respective first random number storage apparatuses 301-$j_1$, 301-$j_2$, . . . , and 301-$j_k$ from the storage apparatuses 300-$j_1$, 300-$j_2$, . . . , and 300-$j_k$. Herein, the values stored in the first random storage apparatuses 301-$j_1$, 301-$j_2$, . . . , and 301-$j_k$ are indicated by $r_{j1}, r_{j2}, \ldots,$ and $r_{jk}$, respectively.

Next, the polynomial reconstruction apparatus 201 outputs a (k−1)-degree polynomial $g_{s\_1(x)}$ on the finite field $GF(p)$ that passes through coordinates $(r_{j\_1}, bs1_{j\_1})$, $(r_{j\_2}, bs1_{j\_2}), \ldots, (r_{j\_k}, bs1_{j\_1})$. Specifically, the polynomial $g_{s\_1(x)}$ is computed by a method of solving simultaneous equations of the like.

Next, the reconstruction apparatus 200 supplies the threshold k to a distributed secret information reconstruction apparatus 202.

The distributed secret information reconstruction apparatus 202 reads out the values stored in the respective distributed distributed secret information storage apparatuses 304-$j_1$, 304-$j_2$, ..., and 304-$j_k$ from the storage apparatuses 300-$j_1$, 300-$j_2$, ..., 300-$j_k$. Herein, the values stored in the distributed distributed secret information storage apparatuses 304-$j_1$, 304-$j_2$, ..., and 304-$j_k$ are indicated by $bs2_{j\_1}$, $bs2_{j\_2}$, ..., and $bs2_{j\_k}$, respectively.

Next, the distributed secret information reconstruction apparatus 202 reads out the values stored in the respective second random number storage apparatuses 303-$j_1$, 303-$j_2$, ..., and 303-$j_k$ from the storage apparatuses 300-$j_1$, 300-$j_2$, ..., and 300-$j_k$. Herein, the values stored in the second random storage apparatuses 303-$j_1$, 303-$j_2$, ..., and 303-$j_k$ are indicated by $x_{j1}$, $x_{j2}$, ..., and $x_{jk}$, respectively.

Next, the distributed secret information reconstruction apparatus 202 outputs a value $g_{s\_2(0)}$ of a (k−1)-degree polynomial $g_{s\_2(x)}$ on the finite field GF(p) that passes through coordinates $(x_{j\_1}, bs2_{j\_1})$, $(x_{j\_2}, bs2_{j\_2})$, ..., $(x_{j\_k}, bs2_{j\_k})$. Specifically, the value $g_{s\_2(0)}$ is computed by a method of solving simultaneous equations, using Lagrange interpolation, or the like.

Next, the reconstruction apparatus 200 supplies the polynomial $g_{s\_1(x)}$ and the value $g_{s\_2(0)}$ to a cheating detection apparatus 203. The cheating detection apparatus 203 checks whether or not $g_{s\_1(t)} = g_{s\_2(0)}$ is satisfied. When $g_{s\_1(t)} = g_{s\_2(0)}$ is satisfied, the reconstruction apparatus 200 outputs the coefficients $(s_0, \ldots, s_{L-1})$ of the terms from the constant term to the (L−1)-degree term of the polynomial $g_{s\_1}$. When $g_{s\_1(t)} = g_{s\_2(0)}$ is not satisfied, the reconstruction apparatus 200 outputs a symbol ⊥ as a symbol indicating detection of cheating.

Next, the exemplary embodiment of a reconstruction result verification apparatus 400 will be described.

A (k−1)-degree polynomial g(x) on the finite field GF(p) is supplied to the reconstruction result verification apparatus 400. Herein, the polynomial g(x) is an output in a certain reconstruction process, for example.

The reconstruction result verification apparatus 400 reads out a value r stored in the first random number storage apparatus 301-$i$ and a value $V_r$ stored in the distributed secret information storage apparatus 302-$i$ from the storage apparatus 300-$i$. Next, it is checked whether or not $g(r)=V_r$ is satisfied. When $g(r)=V_r$ is satisfied, the reconstruction result verification apparatus 400 outputs the coefficients $(s_o, \ldots, s_{L-1})$ of the terms from the constant term to the (L−1)-degree term of the polynomial g. When $g(r)=V_r$ is not satisfied, the reconstruction result verification apparatus 400 outputs the symbol indicating detection of cheating.

When the number of data stored in the storage apparatuses 300 and known by cheaters is indicated by a, and the size of the secret information is indicated by $p^L$, the size of distributed information is indicated by $P^2 \times R_1 \times R_2$. Then, the detection ratio of cheating is indicated by $1-(k-1)/(R_{1-a})$.

Assuming that k=2, t=2, p=$2^{80}$, $\epsilon=\frac{1}{2}^{80}$, $R_2=2^{10}$, the size of the distributed information in the first exemplary embodiment is approximately $2^{250}$.

The size of the distributed information in the second exemplary embodiment is approximately $2^{250}$, assuming that k=2, t=2, p=$2^{160}$, $\epsilon=\frac{1}{2}^{80}$, R2=$2^{10}$, and L=2. It can be seen that the size of the distributed information is smaller than those in the first exemplary embodiment and in the method described in Non-patent Document 1.

However, distributed information with a size less than the threshold has a property that information on secret information leaks. In the second exemplary embodiment as well, depending on the operation form, a case where a participant does not need verification of a result of a reconstruction process in which he has not participated may be considered. In this case, by removing the reconstruction result verification apparatus 400 and the polynomial f output by the reconstruction apparatus 200, a secret information distribution system for determining whether or not there is a falsified data share in the reconstruction process in which the participant has participated can be configured. The size of the random number $R_2$ is not related to safety. Then, depending on the operation form, an ID number assigned to each storage apparatus can be used. In that case, the size of the distributed information corresponding to the random number $R_2$ can be reduced.

INDUSTRIAL APPLICABILITY

The present invention can be used for distributed management of confidential information on a secret key or the like. Consider a situation where a part of distributed information prepared by a personal computer is uploaded to a server or the like, and a part of the distributed information is stored in a USB memory and carried, for example. The information on the secret key can be distributed so that the information on the secret key never leaks even if only the information in the server or only the information stored in the USB memory is stolen. Accordingly, the confidential information can be used while safely managing the confidential information.

Modifications and adjustments of the exemplary embodiment and embodiments are possible within the scope of the overall disclosure (including claims) of the present invention, and based on the basic technical concept of the invention. Various combinations and selections of various disclosed elements are possible within the scope of the claims of the present invention.

What is claimed is:

1. A distributed information generation apparatus that distributes secret information, comprising:
a secret information distribution apparatus;
a distributed secret information distribution apparatus; and
a distribution input means that receives secret information s, a threshold k, a number of distributed information n, and a predetermined fixed value t; wherein
the secret information distribution apparatus includes:
a first random number generation apparatus that generates n first random numbers which are different from the fixed value t and are different from one another, and outputs the generated first random numbers;
a first distribution polynomial generation apparatus that generates a (k−1)-degree polynomial F by embedding the secret information s in the (k−1)-degree polynomial F; and
a distributed information output apparatus that enters the respective first random numbers into the polynomial F to output values and also enters the fixed value t into the polynomial F to output a value; and wherein
the distributed secret information distribution apparatus includes:
a second random number generation apparatus that generates n second random numbers that are different from one another, and outputs the generated second random numbers;
a second distribution polynomial generation apparatus that generates a (k−1)-degree polynomial G by embedding the output of the distributed information output apparatus in the (k−1)-degree polynomial G, the output of the distributed information output apparatus being the output when the fixed value t is entered into the polynomial F; and a distributed distributed information output apparatus that enters the respective second random numbers into the polynomial G to output values.

2. The distributed information generation apparatus according to claim 1, wherein
the distribution input means receives parameters L of a number that is less
than or equal to k−1;
the first distribution polynomial generation apparatus generates the polynomial F by embedding the secret information s in a value obtained by connecting coefficients of terms from a constant term to an (L−1)-degree term of the polynomial F; and
the second distribution polynomial generation apparatus generates the polynomial G in which the output when the fixed value t is entered into the polynomial F is set to a constant term.

3. The distributed information generation apparatus according to claim 2, wherein
the first distribution polynomial generation apparatus generates the polynomial F by embedding the secret information s in the constant term of the polynomial F alone when the number of the parameters L is 1.

4. The distributed information generation apparatus according to claim 1, wherein
the first random number generation apparatus generates n constants that are different from the fixed value t and are different from one another, as the first random numbers, or the second random number generation apparatus generates n constants that are different from one another, as the second random numbers.

5. The distributed information generation apparatus according to claim 1, comprising:
storage apparatuses that associate and store the first random numbers output by the first random number generation apparatus and the values output by the distributed information output apparatus when the first random numbers are entered into the polynomial F, and associate and store the second random numbers output by the second random number generation apparatus and the values output by the distributed distributed information output apparatus when the second random numbers are entered into the polynomial G.

6. A reconstruction result verification system including:
a distributed information generation apparatus that distributes secret information, comprising:
a secret information distribution apparatus;
a distributed secret information distribution apparatus; and
a distribution input means that receives secret information s, a threshold k, a number of distributed information n, and a predetermined fixed value t; wherein
the secret information distribution apparatus includes:
a first random number generation apparatus that generates n first random numbers which are different from the fixed value t and are different from one another, and outputs the generated first random numbers;
a first distribution polynomial generation apparatus that generates a (k−1)-degree polynomial F by embedding the secret information s in the (k−1)-degree polynomial F; and
a distributed information output apparatus that enters the respective first random numbers into the polynomial F to output values and also enters the fixed value t into the polynomial F to output a value; and wherein the distributed secret information distribution apparatus includes:
a second random number generation apparatus that generates n second random numbers that are different from one another, and outputs the generated second random numbers;
a second distribution polynomial generation apparatus that generates a (k−1)-degree polynomial G by embedding the output of the distributed information output apparatus in the (k−1)-degree polynomial G, the output of the distributed information output apparatus being the output when the fixed value t is entered into the polynomial F; and
a distributed distributed information output apparatus that enters the respective second random numbers into the polynomial G to output values; and
a reconstruction result verification apparatus that verifies a value output by a reconstruction apparatus that reconstructs secret information, wherein
the reconstruction result verification apparatus receives a (k−1)-degree polynomial F output by the reconstruction apparatus and receives from storage apparatuses that store the outputs of the distributed information generation apparatus, a pair of a first random number r output by the secret information distribution apparatus, and an output v when the first random number r is entered into the polynomial F generated by the secret information distribution apparatus,
outputs information indicating that cheating has not been detected when the received value v is equal to an output obtained by entering the first random number r into the polynomial F, and
outputs information indicating detection of cheating when the received value v is not equal to the output.

7. A method of generating distributed information comprising:
a distribution input step of receiving by a distribution input means information s, a threshold k, a number of distributed information n, and a predetermined fixed value t;
a secret information distribution step; and
a distributed secret information distribution step;
the secret information distribution step including:
a first random number generation step of generating by a secret information distribution apparatus n first random numbers that are different from the fixed value t and are different from one another, and outputting the generated first random numbers to store the generated first random numbers in a storage unit;
a first distribution polynomial generation step of generating by the secret information distribution apparatus a (k−1)-degree polynomial F by embedding the secret information s in the (k−1)-degree polynomial F; and
a distributed information output step of entering by the secret information distribution apparatus the respective first random numbers into the polynomial F to output values and also entering the fixed value t into the polynomial F to output a value to store the generated first random numbers in a storage unit;
the distributed secret information distribution step including:
a second random number generation apparatus step of generating by a distributed secret information distribution apparatus n second random numbers that are different from one another, and outputting the generated second random numbers to store the generated second random numbers in a storage unit;

a second distribution polynomial generation step of generating by the distributed secret information distribution apparatus a (k−1)-degree polynomial G by embedding the output of the distributed information output step in the (k−1)-degree polynomial G, the output of the distributed information output step being the output when the fixed value t is entered into the polynomial F; and a distributed distributed information output step of entering by the distributed secret information distribution apparatus the respective second random numbers into the polynomial G to output values.

8. The distributed information generation method according to claim 7, wherein in the distribution input step, parameters L of a number that is less than or equal to k−1 are received by the distribution input means;

in the first distribution polynomial generation step, the polynomial F is generated by the secret information distribution apparatus by embedding the secret information s in a value obtained by connecting coefficients of terms from a constant term to an (L−1)-degree term of the polynomial F; and in the second distribution polynomial generation step, the polynomial G in which the output when the fixed value t is entered into the polynomial F is set to a constant term is generated by the distributed secret information distribution apparatus.

9. The distributed information generation method according to claim 8, wherein in the first distribution polynomial generation step, the polynomial F is generated by the secret information distribution apparatus by embedding the secret information s in the constant term alone when the number of the parameters L is 1.

10. The distributed information generation method according to claim 7, wherein in the first random number generation step, n constants that are different from the fixed value t and are different from one another are generated and output by the secret information distribution apparatus, as the first random numbers, or in the second random number generation step, n constants that are different from one another are generated and output by the distributed secret information distribution apparatus, as the second random numbers.

11. The distributed information generation method according to claim 7, wherein the first random numbers output in the first random number generation step and the values output in the distributed information output step when the first random numbers are entered into the polynomial F are associated and stored by the secret information distribution apparatus, and the second random numbers output in the second random number generation step and the values output in the distributed distributed information output step when the second random numbers are entered into the polynomial G are associated and stored in storage apparatuses by the distributed secret information distribution apparatus.

12. A reconstruction result verification method for verifying restored secret information, comprising a distributed information generation step that includes:

a distribution input step, performed by a computing device, of receiving secret information s, a threshold k, a number of distributed information n, and a predetermined fixed value t;

a secret information distribution step, performed by the computing device; and a distributed secret information distribution step, performed by the computing device;

the secret information distribution step including:

a first random number generation step, performed by the computing device, of generating n first random numbers that are different from the fixed value t and are different from one another, and outputting the generated first random numbers;

a first distribution polynomial generation step, performed by the computing device, of generating a (k−1)-degree polynomial F by embedding the secret information s in the (k−1)-degree polynomial F; and a distributed information output step, performed by the computing device, of entering the respective first random numbers into the polynomial F to output values and also entering the fixed value t into the polynomial F to output a value;

the distributed secret information distribution step including:

a second random number generation apparatus step, performed by the computing device, of generating n second random numbers that are different from one another, and outputting the generated second random numbers;

a second distribution polynomial generation step, performed by the computing device, of generating a (k−1)-degree polynomial G by embedding the output of the distributed information output step in the (k−1)-degree polynomial G, the output of the distributed information output step being the output when the fixed value t is entered into the polynomial F; and a distributed distributed information output step, performed by the computing device, of entering the respective second random numbers into the polynomial G to output values, wherein a (k−1)-degree polynomial F is received as the restored secret information, a pair of a first random number r output in the secret information distribution step and an output v when the first random number r is entered into the polynomial F generated in the secret information distribution step are received from storage apparatuses that store the contents output in the distributed information generation step, information indicating that cheating has not been detected is output when the received value v is equal to an output obtained by entering the first random number r into the polynomial F, and information indicating detection of cheating is output when the received value v is not equal to the output.

13. A computer-readable memory device storing a distributed information generation program for distributing secret information, the distributed information generation program causing a computer to execute:

a distribution input process that receives secret information s, a threshold k, a number of distributed information n, and a predetermined fixed value t;

a secret information distribution process; and a distributed secret information distribution process;

in the secret information distribution process, the computer being caused to execute:

a first random number generation process that generates n first random numbers which are different from the fixed value t and are different from one another, and outputs the generated first random numbers;

a first distribution polynomial generation process that generates a (k−1)-degree polynomial F by embedding the secret information s in the (k−1)-degree polynomial F; and a distributed information output process that enters the respective first random numbers into the polynomial F to output values and also enters the fixed value t into the polynomial F to output a value;

in the distributed secret information distribution process, the computer is caused to execute:

a second random number generation process that generates n second random numbers which are different from one another, and outputs the generated second random numbers;

a second distribution polynomial generation process that generates a (k−1)-degree polynomial G by embedding the output of the distributed information output process in the (k−1)-degree polynomial G, the output of the distributed information output process being the output when the fixed value t is entered into the polynomial F; and a distributed distributed information output process that enters the respective second random numbers to the polynomial G to output values.

14. The computer-readable memory device according to claim 13, storing the program causing the computer to execute:

a process of receiving parameters L of a number that is less than or equal to k−1 in the distribution input process;

a process of generating the polynomial F by embedding the secret information s in a value obtained by connecting coefficients of terms from a constant term to an (L−1)-degree term of the polynomial F, in the first distribution polynomial generation process; and a process of generating the polynomial G in which the output when the fixed value t entered into the polynomial F is set to a constant term, in the second distribution polynomial generation process.

15. The computer-readable memory device according to claim 14, storing the program causing the computer to execute:

a process of generating the polynomial F by embedding the secret information s in the constant term alone when the number of the parameters L is 1.

16. The computer-readable memory device according to claim 13, storing the program causing the computer to execute:

a process of generating n constants that are different from the fixed value t and are different from one another, as the first random numbers in the first random number generation process, or a process of generating n constants that are different from one another, as the second random numbers in the second random number generation process.

17. The computer-readable memory device according to claim 13, storing the program causing the computer to execute:

a process of associating and storing in storage apparatuses the first random numbers output in the first random number generation process and the outputs in the distributed information output process when the first random numbers are entered into the polynomial F, and associating and storing in the storage apparatuses the second random numbers output in the second random number generation process and the outputs in the distributed distributed information output process when the second random numbers are entered into the polynomial G.

18. The computer-readable memory device according to claim 13, storing further a reconstruction result verification program for verifying reconstructed secret information, the reconstruction result verification program causing the computer to execute:

a process of receiving a (k−1)-degree polynomial F as the reconstructed secret information and receiving from the storage apparatuses that store the contents output by the distributed information generation program a pair of a first random number r output by the secret information distribution process, and an output v when the first random number r is entered into the polynomial F generated by the secret information distribution process, outputting information indicating that cheating has not been detected when the received value v is equal to an output obtained by entering the first random number r into the polynomial F, and outputting information indicating detection of cheating when the received value v is not equal to the output.

19. A distributed information generation apparatus comprising:

a secret information distribution apparatus that receives secret information s, a threshold k, a number of distributed information n, and a predetermined fixed value t, generates and outputs n first random numbers which are different from the fixed value t and are different from one another, generates a (k−1)-degree polynomial F by embedding the secret information s in the (k−1)-degree polynomial F, enters the respective first random numbers into the polynomial F to output values, and enters the fixed value t into the polynomial F to output a value; and a distributed secret information distribution apparatus that generates and outputs n second random numbers that are different from one another, generates a (k−1)-degree polynomial G by embedding in the (k−1)-degree polynomial G the output of the secret information distribution apparatus when the fixed value t is entered into the polynomial F, and enters the respective second random numbers into the polynomial G to output values.

20. The distributed information generation apparatus according to claim 19, wherein the secret information distribution apparatus receives parameters L of a number that is less than or equal to k−1, and generates the polynomial F by embedding the secret information s in a value obtained by connecting coefficients of terms from a constant term to an (L−1)-degree term of the polynomial F; and the secret information distribution apparatus generates the polynomial G in which the output when the fixed value t is entered into the polynomial F is set to a constant term.

21. The distributed information generation apparatus according to claim 20, wherein the secret information distribution apparatus generates the polynomial F by embedding the secret information s in the constant term alone when the number of the parameters L is 1.

22. The distributed information generation apparatus according to claim 19, wherein the secret information distribution apparatus generates and outputs n constants that are different from the fixed value t and are different from one another, as the first random numbers.

23. The distributed information generation apparatus according to claim 19, wherein the distributed secret information distribution apparatus generates and outputs n constants that are different from one another, as the second random numbers.

24. The distributed information generation apparatus according to claim 19, comprising:
storage apparatuses that associate and store the first random numbers output from the secret information distribution apparatus and the outputs when the first random numbers are entered into the polynomial F, and associate and store the second random numbers output from the distributed secret information distribution apparatus and the outputs when the second random numbers are entered into the polynomial G.

25. A reconstruction apparatus that reconstructs secret information based on outputs of a distributed information generation apparatus that distributes the secret information, wherein
the reconstruction apparatus receives a threshold k and a predetermined fixed value t; and
the reconstruction apparatus comprises:
storage apparatuses that store the outputs of the secret information distribution apparatus of the distributed information generation apparatus as set forth in claim 19;
a polynomial reconstruction apparatus that receives from the storage apparatuses k pairs of the first random numbers output by the secret information distribution apparatus of the distributed information generation apparatus as set forth in claim 19 and the outputs when the first random numbers are entered into the (k−1)-degree polynomial F generated by the secret information distribution apparatus, and generates a (k−1)-degree polynomial F' that respectively supplies outputs $v_1$ through $v_k$ when the received first random numbers indicated by $r_1$, through $r_k$ are entered, the outputs $v_1$ through $v_k$ being the outputs when the first random numbers $r_1$ through $r_k$ are entered into the polynomial F;
a distributed secret information reconstruction apparatus that receives from the storage apparatuses k pairs of the second random numbers output by the distributed secret information distribution apparatus of the distributed information generation apparatus as set forth in claim 19 and the outputs when the second random numbers are entered into the (k−1)-degree polynomial G generated by the distributed secret information distribution apparatus, and generates a (k−1)-degree polynomial G' that respectively supplies outputs $w_1$ through $w_k$ when the received second random numbers indicated by are entered, the outputs being the outputs when the second random numbers are entered into the polynomial G; and
a cheating detection apparatus that outputs a value embedded in the polynomial F' as the secret information when a value embedded in the polynomial G' is equal to an output obtained by entering the fixed value t into the polynomial F' and outputs information indicating detection of cheating when the value embedded in the polynomial G' is not equal to the output.

26. The reconstruction apparatus according to claim 25, wherein
the secret information distribution apparatus of the distributed information generation apparatus receives parameters L of a number that is less than or equal to k−1, generates the polynomial F by embedding secret information s in a value obtained by connecting coefficients of terms from a constant term to an (L−1) degree term of the polynomial F, and the distributed secret information distribution apparatus of the distributed information generation apparatus generates the polynomial G in which an output when the fixed value t is entered into the polynomial F is set to a constant term;
the storage apparatuses store the outputs of the distributed information generation apparatus;
the reconstruction apparatus receives the parameters L of the number that is less than or equal to (k−1);
the polynomial reconstruction apparatus receives from the storage apparatuses k pairs of the first random numbers output by the secret information distribution apparatus of the distributed information generation apparatus and the outputs when the first random numbers are entered into the (k−1) degree polynomial F generated by the secret information distribution apparatus, and generates the (k−1) degree polynomial F';
the distributed secret information reconstruction apparatus receives from the storage apparatuses k pairs of the second random numbers output by the distributed secret information distribution apparatus of the distributed information generation apparatus and the outputs when the second random numbers are entered into the (k−1) degree polynomial G generated by the distributed secret information distribution apparatus, and generates the (k−1) degree polynomial G'; and
the cheating detection apparatus outputs a value obtained by connecting a constant term to an (L−1)-degree term of the polynomial F' as the secret information when the constant term of the polynomial G' is equal to the output obtained by entering the fixed value t into the polynomial F', and outputs the information indicating detection of cheating when the constant term is not equal to the output.

27. The reconstruction apparatus according to claim 26, wherein
the secret information distribution apparatus of the distributed information generation apparatus embeds the secret information s in the constant term of the polynomial F alone, to generate the polynomial F, instead of generating the polynomial F by embedding the secret information s in the value obtained by connecting the coefficients of the terms from the constant term to the (L−1) degree term of the polynomial F;
the storage apparatuses store the outputs of the distributed information generation apparatus;
the polynomial reconstruction apparatus receives from the storage apparatuses k pairs of the first random numbers output by the secret information distribution apparatus of the distributed information generation apparatus and the outputs when the first random numbers are entered into the (k−1) degree polynomial F generated by the secret information distribution apparatus, thereby generating a (k−1) degree polynomial F'; and
the cheating detection apparatus outputs a constant term of the polynomial F' as the secret information when the constant term of the polynomial G' is equal to an output obtained by entering the fixed value t into the polynomial F', and outputs the information indicating detection of cheating when the constant term of the polynomial G' is not equal to the output.

28. The reconstruction apparatus according to claim 25, wherein
the secret information distribution apparatus of the distributed information generation apparatus generates and outputs n constants that are different from the fixed value t and are different from one another, as the first random numbers;

the storage apparatuses stores the outputs of the distributed information generation apparatus;

the polynomial reconstruction apparatus receives k pairs of the first random numbers output by the secret information distribution apparatus of the distributed information generation apparatus and the outputs when the first random numbers are entered into the (k−1) degree polynomial F generated by the secret information distribution apparatus, thereby generating the (k−1)-degree polynomial F';

the distributed secret information reconstruction apparatus receives from the storage apparatuses k pairs of the second random numbers output by the distributed secret information distribution apparatus of the distributed information generation apparatus and the outputs when the second random numbers are entered into the (k−1) degree polynomial G generated by the distributed secret information distribution apparatus, and generates the (k−1) degree polynomial G'; and the polynomial reconstruction apparatus receives n constants that are different from the constant value t and are different from one another, as the first random numbers, or the distributed secret information reconstruction apparatus receives n constants that are different from one another, as the second random numbers.

29. The reconstruction apparatus according to claim 25, wherein
the cheating detection apparatus outputs the polynomial F' in addition to each output content obtained by entering the fixed value t into the polynomial F', when the output content is equal to the value embedded in the polynomial G'.

30. A reconstruction result verification system, comprising:
a distributed information generation apparatus and a reconstruction result verification apparatus that verifies a value output by a reconstruction apparatus that reconstructs secret information;
wherein the distributed information generation apparatus includes:
a secret information distribution apparatus that receives secret information s, a threshold k, a number of distributed information n, and a predetermined fixed value t, generates and outputs n first random numbers which are different from the fixed value t and are different from one another, generates a (k−1)-degree polynomial F' by embedding the secret information s in the (k−1)-degree polynomial F' enters the respective first random numbers into the polynomial F to output values, and enters the fixed value t into the polynomial F to output a value; and
a distributed secret information distribution apparatus that generates and outputs n second random numbers that are different from one another, generates a (k−1)-degree polynomial G by embedding in the (k−1)-degree polynomial G the output of the secret information distribution apparatus when the fixed value t is entered into the polynomial F, and enters the respective second random numbers into the polynomial G to output values,
wherein the reconstruction result verification apparatus includes:
a unit that receives a (k−1)-degree polynomial F output by the reconstruction apparatus and receives from storage apparatuses that store the outputs of the distributed information generation apparatus, a pair of a first random number r output by the secret information distribution apparatus of the distributed information generation apparatus and an output v when the first random number r is entered into the polynomial F generated by the secret information distribution apparatus, a unit that outputs information indicating that cheating has not been detected when the received value v is equal to an output obtained by entering the first random number r into the polynomial F, and a unit that outputs information indicating detection of cheating when the received value v is not equal to the output.

31. A reconstruction apparatus comprising:
a reconstruction input means that receives a threshold k and a fixed value t;
a polynomial reconstruction apparatus that receives values $v_1$ through $v_k$ and values $r_1$ through $r_k$ which are different from one another and outputs a (k−1)-degree polynomial F' which respectively supplies the values $v_1$ through $v_k$ when the values $r_1$ through $r_k$ are entered;
a distributed secret information restoration apparatus that receives values $w_1$ through $w_k$ and values $x_1$ through $x_k$ which are different from one another and outputs a (k−1)-degree polynomial G' which respectively supplies the values $w_1$ through $w_k$ when the values $x_1$ through $x_k$ are entered; and
a cheating detection apparatus that outputs a value embedded in the polynomial F' as secret information when a value embedded in the polynomial G' is equal to an output obtained by entering the fixed value t into the polynomial F' and outputs information indicating detection of cheating when the value embedded in the polynomial G' is not equal to the output.

32. The reconstruction apparatus according to claim 31, wherein
the reconstruction input means receives parameters L of a number less than or equal to k−1; and
the cheating detection apparatus uses a constant term of the polynomial G' as the value embedded in the polynomial G' and uses a value obtained by connecting coefficients of terms from a constant term to an (L−1) degree term of the polynomial F' as the secret information.

33. The reconstruction apparatus according to claim 31, wherein
the cheating detection apparatus uses a constant term of the polynomial G' as the value embedded in the polynomial G' and uses a constant term of the polynomial F' as the secret information.

34. The reconstruction apparatus according to claim 31, wherein
the cheating detection apparatus outputs the polynomial F' in addition to each output content obtained by entering the fixed value t into the polynomial F' when the output content is equal to the value embedded in the polynomial G'.

35. A reconstruction method for reconstructing secret information, the method comprising:
receiving by a reconstruction input means a threshold k and a fixed value t;
receiving by a polynomial reconstruction apparatus values $v_1$ through $v_k$ and values $r_1$ through $r_k$ which are different from one another and outputting a (k−1)-degree polynomial F' which respectively supplies the values $v_1$ through $v_k$ when the values $r_1$ through $r_k$ are entered;
receiving by a distributed secret information restoration apparatus values $w_1$ through $w_k$ and values $x_1$ through $x_k$ which are different from one another and outputting a (k−1)-degree polynomial G' which respectively supplies the values $w_1$ through $w_k$ when the values $x_1$ through $x_k$ are entered; and outputting by a cheating detection apparatus a value embedded in the polynomial F' as secret information when a value embedded in the polynomial G' is equal to an output obtained by entering the fixed value t into the polynomial F', and outputting information indicating detection of cheating when the value embedded in the polynomial G' is not equal to the output.

36. The reconstruction method according to claim 35, comprising:

receiving by the reconstruction input means parameters L of a number less than or equal to k−1; and when outputting the value embedded in the polynomial F', the cheating detection apparatus, using a constant term of the polynomial G' as the value embedded in the polynomial G', and using a value obtained by connecting coefficients of terms from a constant term to an (L−1) degree term of the polynomial F' as the secret information.

37. The reconstruction method according to claim 35, comprising:

when outputting the value embedded in the polynomial F', the cheating detection apparatus using a constant term of the polynomial G' as the value embedded in the polynomial G', and using a constant term of the polynomial F' as the secret information.

38. The reconstruction method according to claim 35, comprising:

in the cheating detection step, the cheating detection apparatus outputting the polynomial F' in addition to each output content obtained by entering the fixed value t into the polynomial F', when the output content is equal to the value embedded in the polynomial G'.

39. A computer-readable memory device storing a reconstruction program for reconstructing secret information, the program causing a computer to execute:

a reconstruction input process of receiving a threshold k and a fixed value t;

a polynomial reconstruction process of receiving values $v_1$ through $v_k$ and values $r_1$ through $r_k$ which are different from one another and outputting a (k−1)-degree polynomial F' which respectively supplies the values $v_1$ through $v_k$ when the values $r_1$ through $r_k$ are entered; and a distributed secret information reconstruction process of receiving values $w_1$ through $w_k$ and values $x_1$ through $x_k$ which are different from one another and outputting a (k−1)-degree polynomial G' which respectively supplies the values $w_1$ through $w_k$ when the values $x_1$ through $x_k$ are entered; and a cheating detection process of outputting a value embedded in the polynomial F' as secret information when a value embedded in the polynomial G' is equal to an output obtained by entering the fixed value t into the polynomial F', and outputting information indicating detection of cheating when the value embedded in the polynomial G' is not equal to the output.

40. The computer-readable memory device according to claim 39, wherein in the reconstruction input process, parameters L of a number less than or equal to k−1 are received; and in the cheating detection process, a constant term of the polynomial G' is used as the value embedded in the polynomial G' and a value obtained by connecting coefficients of terms from a constant term to an (L−1) degree term of the polynomial F' is used as the secret information.

41. The computer-readable memory device according to claim 39, wherein in the cheating detection process, a constant term of the polynomial G' is used as the value embedded in the polynomial G' and a constant term of the polynomial F' is used as the secret information.

42. The computer-readable memory device according to claim 39, storing the program causing the computer to execute:

a process of outputting the polynomial F' in addition to each output content obtained by entering the fixed value t into the polynomial F' when the output content is equal to the value embedded in the polynomial G' in the cheating detection process.

* * * * *